US009421507B2

(12) United States Patent
Miller

(10) Patent No.: US 9,421,507 B2
(45) Date of Patent: Aug. 23, 2016

(54) MICRO-CHANNELS, MICRO-MIXERS AND MICRO-REACTORS

(71) Applicant: State of Oregon acting by and through the State Board of Higher Education on behalf of Oregon State University, Corvallis, OR (US)

(72) Inventor: Richard Todd Miller, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 512 days.

(21) Appl. No.: 13/841,303

(22) Filed: Mar. 15, 2013

(65) Prior Publication Data

US 2014/0071786 A1    Mar. 13, 2014

Related U.S. Application Data

(60) Provisional application No. 61/640,599, filed on Apr. 30, 2012.

(51) Int. Cl.
*B01F 13/00* (2006.01)
*B01F 15/02* (2006.01)
(Continued)

(52) U.S. Cl.
CPC ........... *B01F 13/0066* (2013.01); *B01F 5/0475* (2013.01); *B01F 5/0478* (2013.01); *B01F 5/0643* (2013.01); *B01F 5/0644* (2013.01); *B01F 5/0692* (2013.01); *B01F 15/0227* (2013.01); *B01F 15/0241* (2013.01); *B01F 15/0246* (2013.01); *B01J 19/0093* (2013.01); *B01J 2219/0086* (2013.01);
(Continued)

(58) Field of Classification Search
CPC ............... B01J 2219/00783; B01J 2219/0086; B01J 2219/00889; B01J 2219/00894; B01J 2219/00903; B01J 2219/00786
See application file for complete search history.

(56) References Cited

U.S. PATENT DOCUMENTS 5,094,793 A * 3/1992 Schrenk ................ B01F 5/0644
366/340
5,803,600 A * 9/1998 Schubert ............... B01F 5/0256
366/337

(Continued)

FOREIGN PATENT DOCUMENTS

JP          2004-113967 A      4/2004
KR     10-2004-0096452 A     11/2004

(Continued)

OTHER PUBLICATIONS

International Search Report for PCT Application No. PCT/US2013/038664 mailed Sep. 23, 2013 (3 pages).

(Continued)

*Primary Examiner* — Tony G Soohoo
(74) *Attorney, Agent, or Firm* — Klarquist Sparkman, LLP

(57) ABSTRACT

A fluid micro-mixer apparatus includes a plurality of first microchannels for receiving a first fluid and a plurality of second microchannels for receiving a second fluid. A mixing chamber flow path is disposed to receive the first and second fluids after the first and second fluids exit their respective output ports. The mixing chamber flow path can include a first mixing chamber in the vicinity of the respective output ports, and the mixing chamber flow path can separate into at least two different flow paths downstream from the first mixing chamber.

24 Claims, 51 Drawing Sheets

(51) Int. Cl.
*B01J 19/00* (2006.01)
*B01F 5/06* (2006.01)
*B01F 5/04* (2006.01)

(52) U.S. Cl.
CPC .......... *B01J 2219/00783* (2013.01); *B01J 2219/00786* (2013.01); *B01J 2219/00822* (2013.01); *B01J 2219/00833* (2013.01); *B01J 2219/00873* (2013.01); *B01J 2219/00889* (2013.01); *B01J 2219/00894* (2013.01); *B01J 2219/00903* (2013.01)

(56) References Cited

U.S. PATENT DOCUMENTS

| | | | |
|---|---|---|---|
| 5,904,424 A * | 5/1999 | Schwesinger | B01F 5/0604 366/336 |
| 6,082,891 A * | 7/2000 | Schubert | B01F 5/0256 366/340 |
| 6,190,034 B1 * | 2/2001 | Nielsen | B01F 5/0604 366/340 |
| 6,264,900 B1 * | 7/2001 | Schubert | B01F 5/0256 366/337 |
| 6,321,998 B1 * | 11/2001 | Schubert | B01F 5/0256 366/340 |
| 6,851,846 B2 * | 2/2005 | Fujii | B01F 5/0453 366/173.2 |
| 7,955,564 B2 | 6/2011 | Seo et al. | |
| 2009/0044619 A1 * | 2/2009 | Fiering | B01F 5/0641 73/202 |
| 2009/0092526 A1 | 4/2009 | Miller | |
| 2013/0114369 A1 | 5/2013 | Ishiyama et al. | |

FOREIGN PATENT DOCUMENTS

| | | |
|---|---|---|
| KR | 10-2009-0043439 A | 5/2009 |
| WO | WO 2006-031058 A1 | 3/2006 |
| WO | WO 2012-002249 A1 | 1/2012 |

OTHER PUBLICATIONS

Written Opinion for PCT Application No. PCT/US2013/038664 mailed Sep. 23, 2013 (5 pages).

* cited by examiner

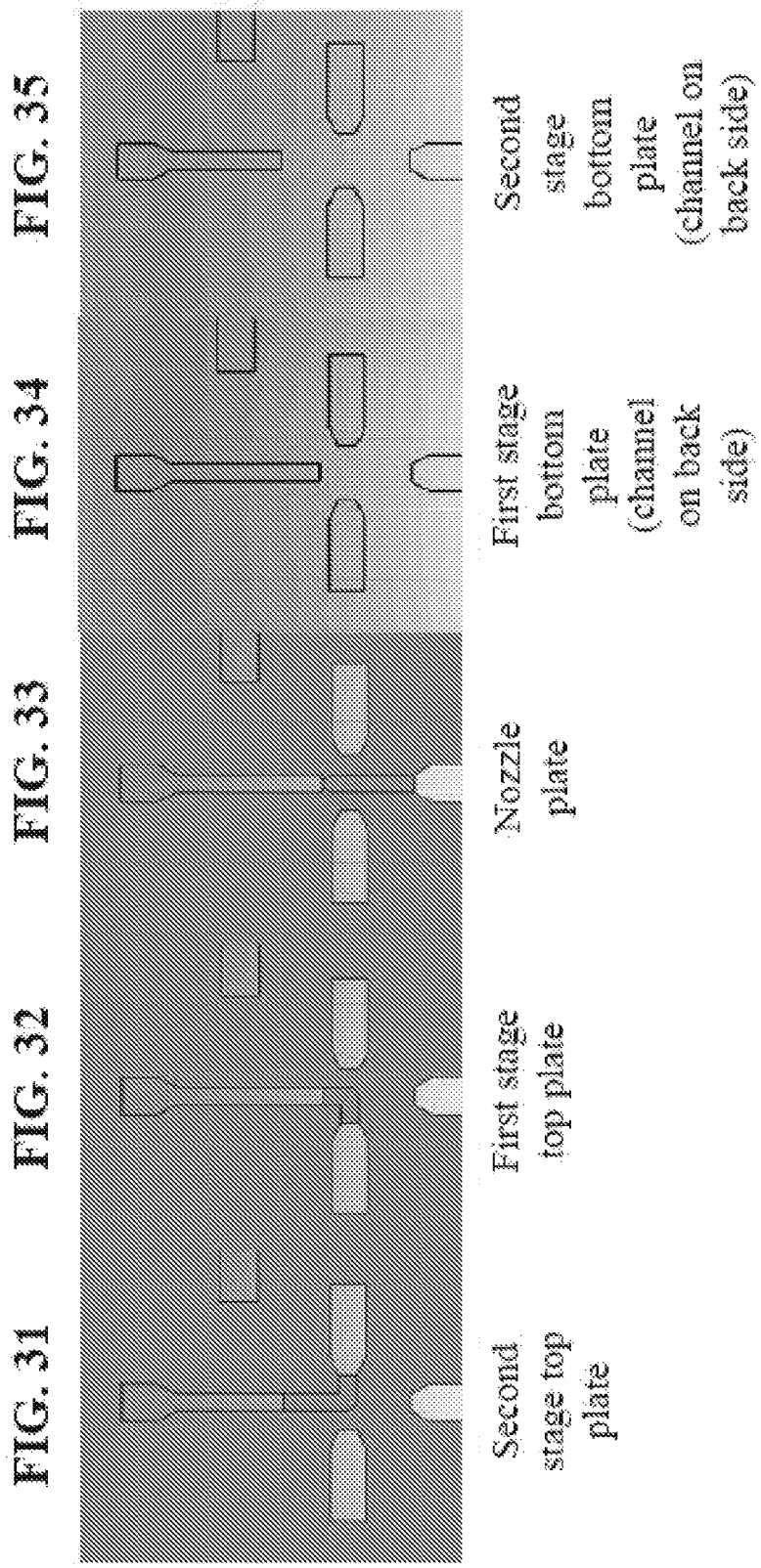

FIG. 37
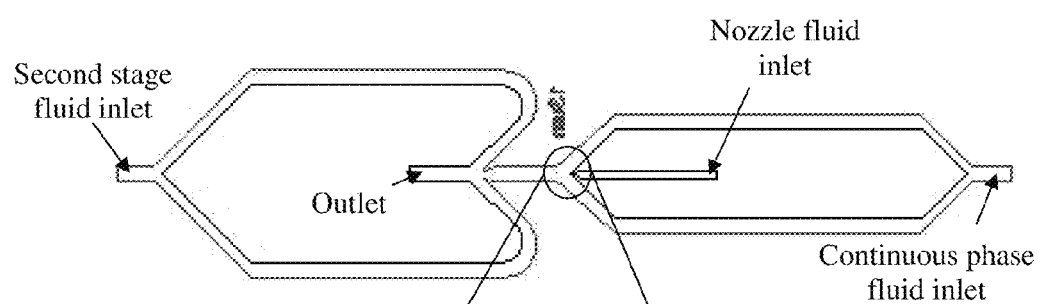
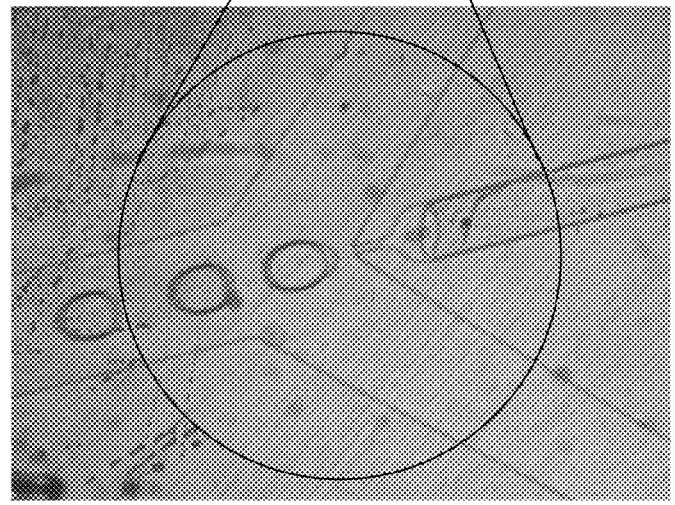
FIG. 38

MICRO-CHANNELS, MICRO-MIXERS AND MICRO-REACTORS

CROSS REFERENCE TO RELATED APPLICATION

This application claims the benefit of the earlier filing date of U.S. Provisional Application No. 61/640,599, filed on Apr. 30, 2012, which is incorporated herein by reference.

STATEMENT OF GOVERNMENT SUPPORT

This invention was made with government support under contract number FA8650-05-1-5041 awarded by AFRL/IF—Air Force Research Laboratory. The government has certain rights in the invention.

FIELD

This application relates generally to fluid flow devices. More particularly, the application relates to devices and methods of manufacturing high-throughput fluid micro-mixers and micro-reactors having micro-channels for mixing of reactants with different viscosities, mixing immiscible liquids, gas-liquid mixing, and controlled incremental introduction of limiting reagents.

BACKGROUND

Micro-fluid processing is a rapidly evolving area in research and industry. The need for control over biochemical and chemical reactions is useful for reducing reagent waste and minimizing sample sizes, in addition to reducing exposure risks that may be associated with working with certain hazardous chemicals.

In the past, molding and lithography techniques have been used to construct planar micro-fluid devices out of pliable materials such as flexible polymers and the like. Though these materials are useful for single-layer mixing devices, the process times and workspace requirements for handling large volumes of reagents, for example, can become very large, which makes processing such devices both difficult and expensive.

SUMMARY

In one embodiment, devices and methods are provided for mixing reactants with different viscosities, mixing immiscible liquids, gas-liquids mixing, and controlled incremental introduction of limiting reagents. The devices and methods can include micro-mixers and micro-reactors arrays having micro-channels for mixing the reactants.

The foregoing and other features and advantages of the disclosed embodiments will become more apparent from the following detailed description, which proceeds with reference to the accompanying figures.

BRIEF DESCRIPTION OF THE DRAWINGS

FIGS. 31-35 show components of a two stage single nozzle device.
FIG. 37 shows a single layer micro-mixer.
FIG. 38 shows a close-up view of a portion of the micro-mixer shown in FIG. 37.

DETAILED DESCRIPTION

Interdigital Micro-Mixer

Figure 1:
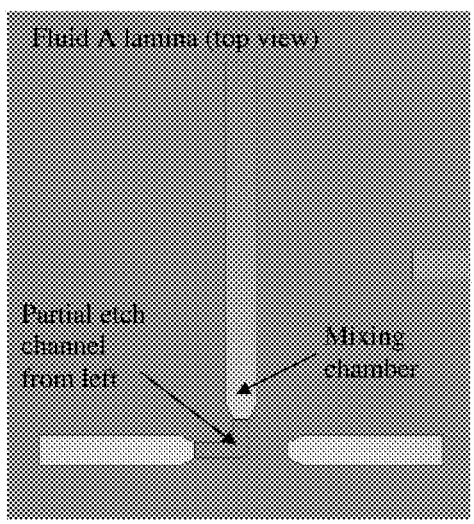
FIG. 1 is a schematic view of a lamina of an interdigital micro-mixer.
Figure 2:
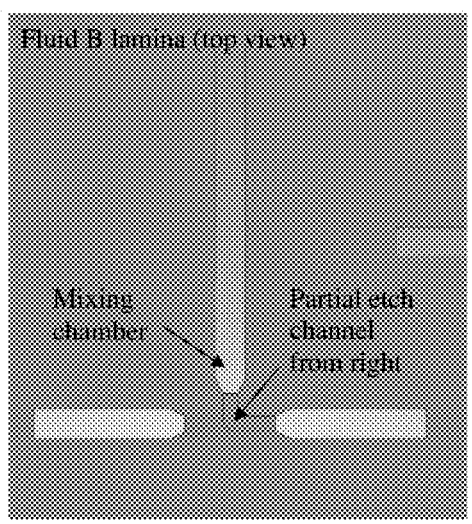
FIG. 2 is a schematic view of a lamina of an interdigital micro-mixer.

This interdigital micro-mixer is created by stacking patterned laminae. Fluid streams are channeled so that very thin fluid layers are interleaved, resulting in very short paths for diffusion of one fluid into the other (and therefore, rapid mixing). FIGS. 1 and 2 show features created using chemical etching with different masks on front and back. Plenums for inlet and outlet reservoirs are creating by etching from both sides while the channels defined the mixer are etched from the front side only.

Figure 3:
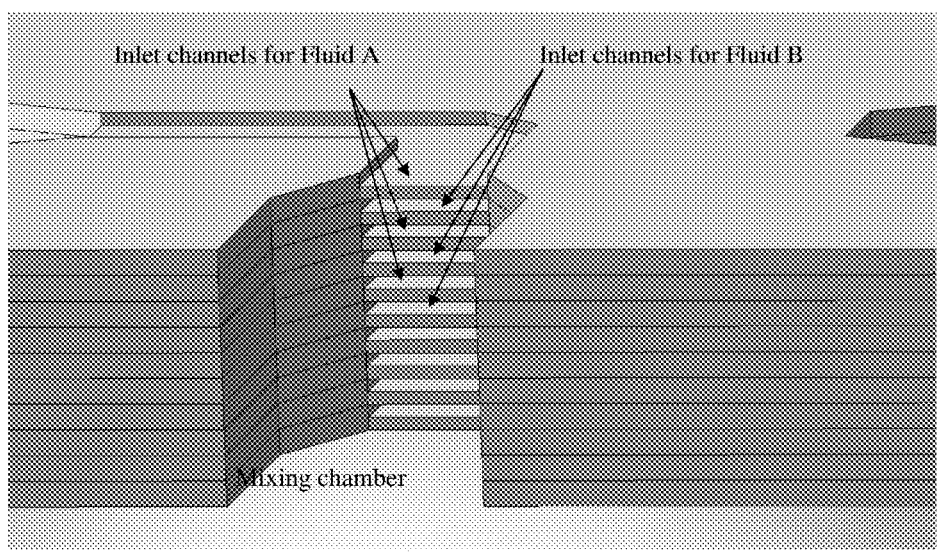
FIG. 3 is a perspective view of a micro-mixer with a plurality of inlet channels.

This design can accommodate mixing of any number of streams as well as sequential or staged mixing. FIG. 3 is a view looking upstream at the channel outlets from the mixing chamber.

Figure 4:
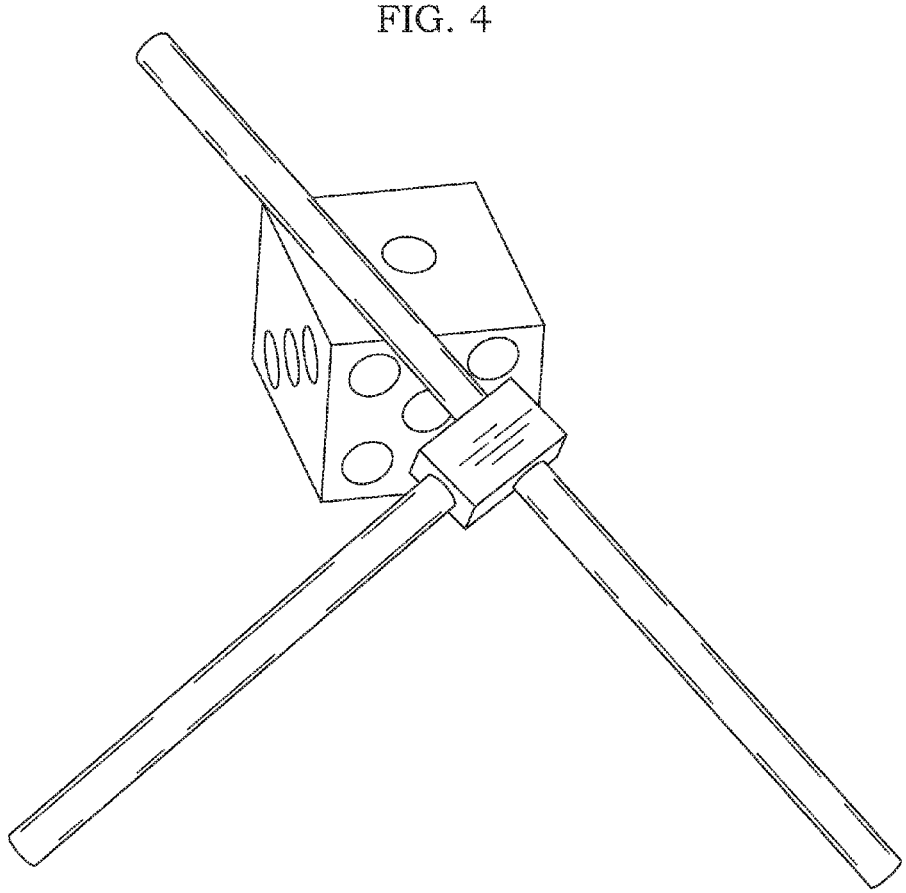
FIG. 4 is an embodiment of a micro-mixer.

FIG. 4 shows another embodiment of the micro-mixer, with a common die next to it for size comparison.

Fabrication techniques used thus far include diffusion bonding (using a vacuum hot press) and wire EDM for separating the individual parts from the array. Layout conventions from the integrated circuit industry have been used to achieve high separation ratios, as well as to create a volume throughput device (see disclosure with OSU docket number 07-32 below). The high separation ratio concept allows lower aspect ratio spans between channel (width vs. thickness of span) to be used and still achieve high volumetric throughput. Lower aspect ratio spans are easier to manufacture, as demonstrated in FIGS. 5-8. Desirably, the aspect ratio is less than 10:1. More desirably, the aspect ratio is less than 8:1, and even more desirably, less than 5:1.

Figures 5, 6:
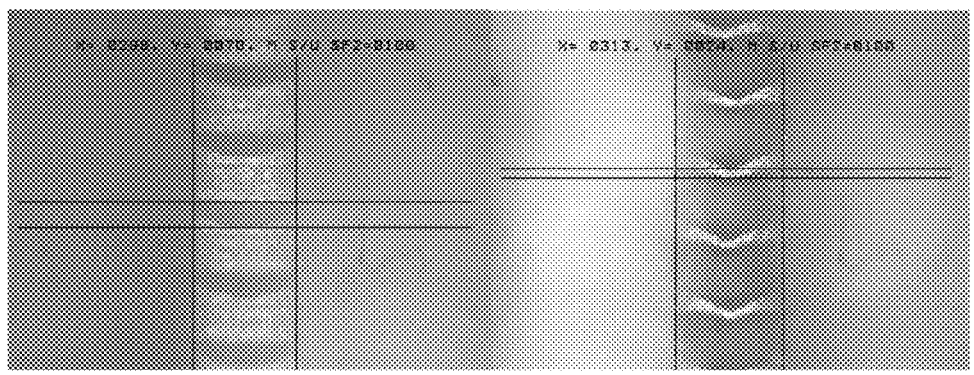
FIG. 5 shows an inlet of a micro-mixer.
FIG. 6 shows an outlet of a micro-mixer.

The device in the FIGS. 5 and 6 has photochemically etched channels in 100 um thick stainless steel that are approximately 300 um in width and 70 micron in depth, leaving a span 30 um (minimum) in thickness and an aspect ratio of 10:1. FIG. 5 shows the structure in the inlet, where the span is supported by a full thickness (100 um) layer, giving an effective minimum span thickness of 130 um and an aspect ratio of 2.3:1. As can be seen this configuration is structurally sound. FIG. 6 shows the outlet of the mixer, where the fluid layers are interdigitated. Some modest warpage or buckling can be seen in these 10:1 spans, indicating a practical limit of the span aspect ratio at this material thickness when constructing using diffusion bonding.

Figures 7, 8:
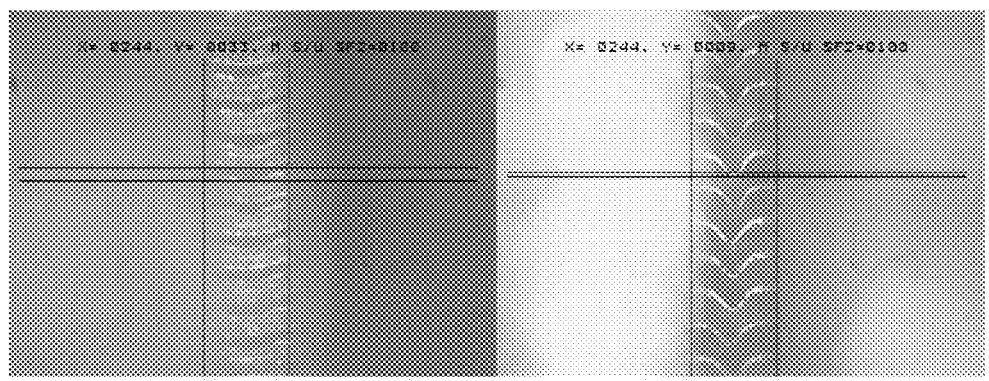
FIG. 7 shows an inlet of a micro-mixer.
FIG. 8 shows an outlet of a micro-mixer.

The device in FIGS. 7 and 8 has photochemically etched channels in 50 um thick stainless steel that are approximately 250 um in width and 35 micron in depth, leaving a span 15 um (minimum) in thickness and an aspect ratio of 17:1. FIG. 7 shows the structure in the inlet, where the span is supported by a full thickness (50 um) layer, giving an effective minimum span thickness of 85 um and an aspect ratio of 2.9:1. As can be seen, this configuration shows some warpage, due to the decreased material strength, which is function of the cube of the thickness. FIG. 8 shows the outlet of the mixer, where the fluid layers are interdigitated. Severe warpage or bucking can be seen in these 17:1 spans, indicating that the span aspect ratio has a practical limit that decreases with decreasing span thickness when constructed using diffusion bonding.

Because the mixing time is an inverse function of the square of the thickness of the fluid laminae created by the interdigital micro-mixer, it is desirable to make these as thin as possible. To do so also requires thin spans between the fluid laminae. Thus, to achieve the highest degree of mixing the approach presented here is to reduce the aspect ratio in individual devices to dimensions that are robust in manufacturing, then array them densely to create a highly parallel system capable of high throughput. Example architectures to create such arrays are discussed in more detail below and in U.S. Provisional Application No. 60/995,329, which is incorporated herein by reference. Further development activities include making devices in polymeric materials, reducing the cost of welding the tubing on the stainless steel devices (through fixturing or alternate welding techniques), reducing bonding costs per part through alternative techniques or increasing the separation ratio of the platform.

Figure 9:
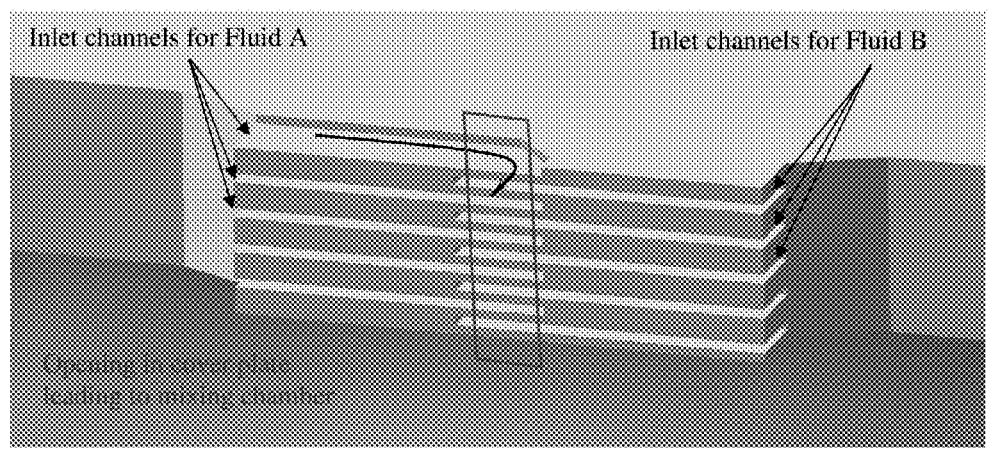
FIG. 9 shows a portion of a micro-mixer.

One example of a polymeric device currently being developed is made by embossing polycarbonate using a diffusion bonded structure as the embossing master. A double transfer embossing process, developed in the MBI, is used to make the final parts. FIG. 9 shows details of the embossed part. A cover plate defines the fourth wall of the inlet chambers and provides the reservoir for the mixing chamber. This embodiment is low cost and easy to manufacture.

Figure 10:
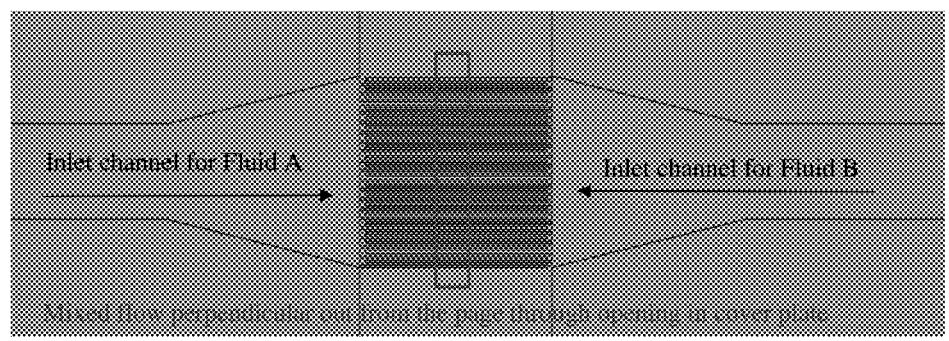
FIG. 10 shows a schematic view of a micro-mixer.

Another embodiment (shown in FIG. 10) is a planar device that can be created using photolithography and soft molding or embossing. This embodiment can be manufactured at very low cost.

A composite structure has also been designed. The interdigital mixing portion is created in metal, taking advantage of the material strength to create the thin laminae. The mixer is then fitted into a polymer housing providing the fluidic connections. One concept for sealing the metal to polymer interfaces is to use infrared radiation. Polymers can be transparent to radiation, while metals will absorb the energy, heating it, and creating localized melting of the polymer at the metal surfaces. By reducing the metal portion to such a small size, very high separation ratios can be achieved (>10 times of a full metal device) and, thus, low cost. The polymer portion can be injection molded as two halves and include integrated fittings or screw threads. Accordingly, a low cost device (<$5 manufacturing cost) can be achieved compared to currently available commercial devices (retail costs from $125 to over $2000).

The construction of devices describe below preferably comprise embossed polymer devices and composite metal and polymer structures.

Interdigital Micro-Mixer Column

Figure 11:
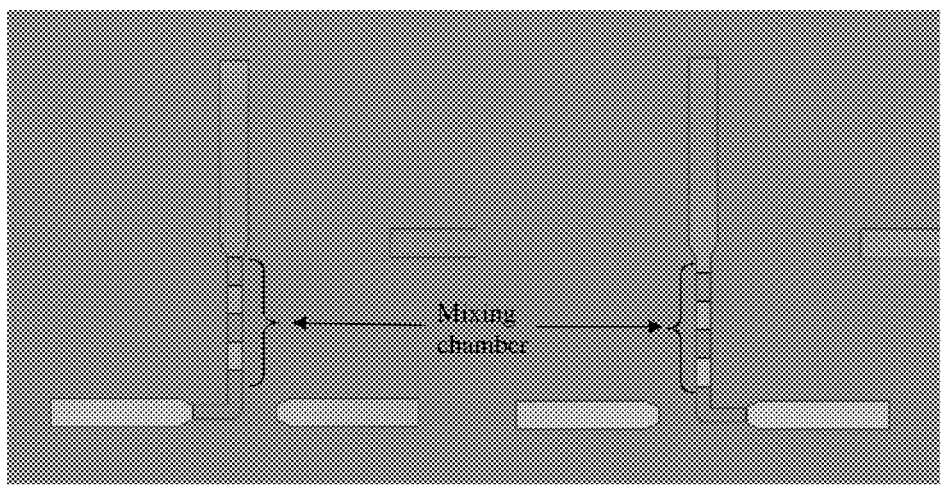
FIG. 11 shows a schematic view of an interdigital micro-mixer.
Figure 12:
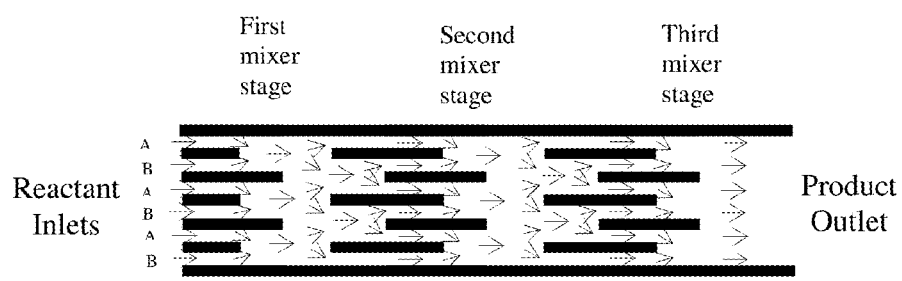
FIG. 12 shows a schematic view of an interdigital micro-mixer.

A key advantage of microchannel technology is the reduction of fluid layer thicknesses to reduce diffusion limitations. This design re-divides the mixed fluids to thin layers again, effectively creating mixing stages in a column. This design also has improved heat transfer with the mixed fluid stream. FIGS. 11 and 12 show how the fluid dividers are staggered, allowing for control of the fluid divisions. A schematic cross section view of the fluid flow is shown in FIG. 12.

Figure 13:
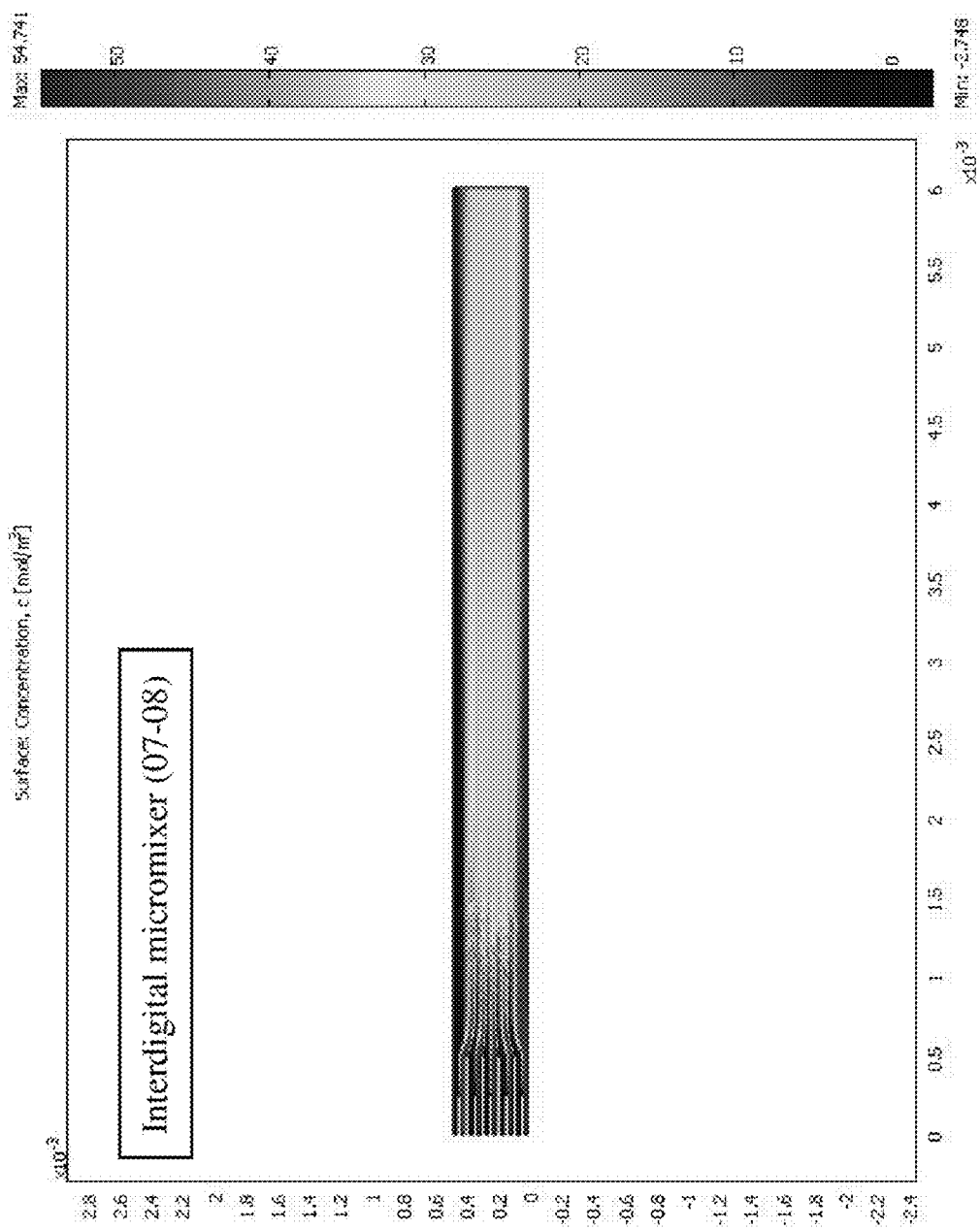
FIG. 13 shows a COMSOL plot showing a concentration profile.
Figure 14:
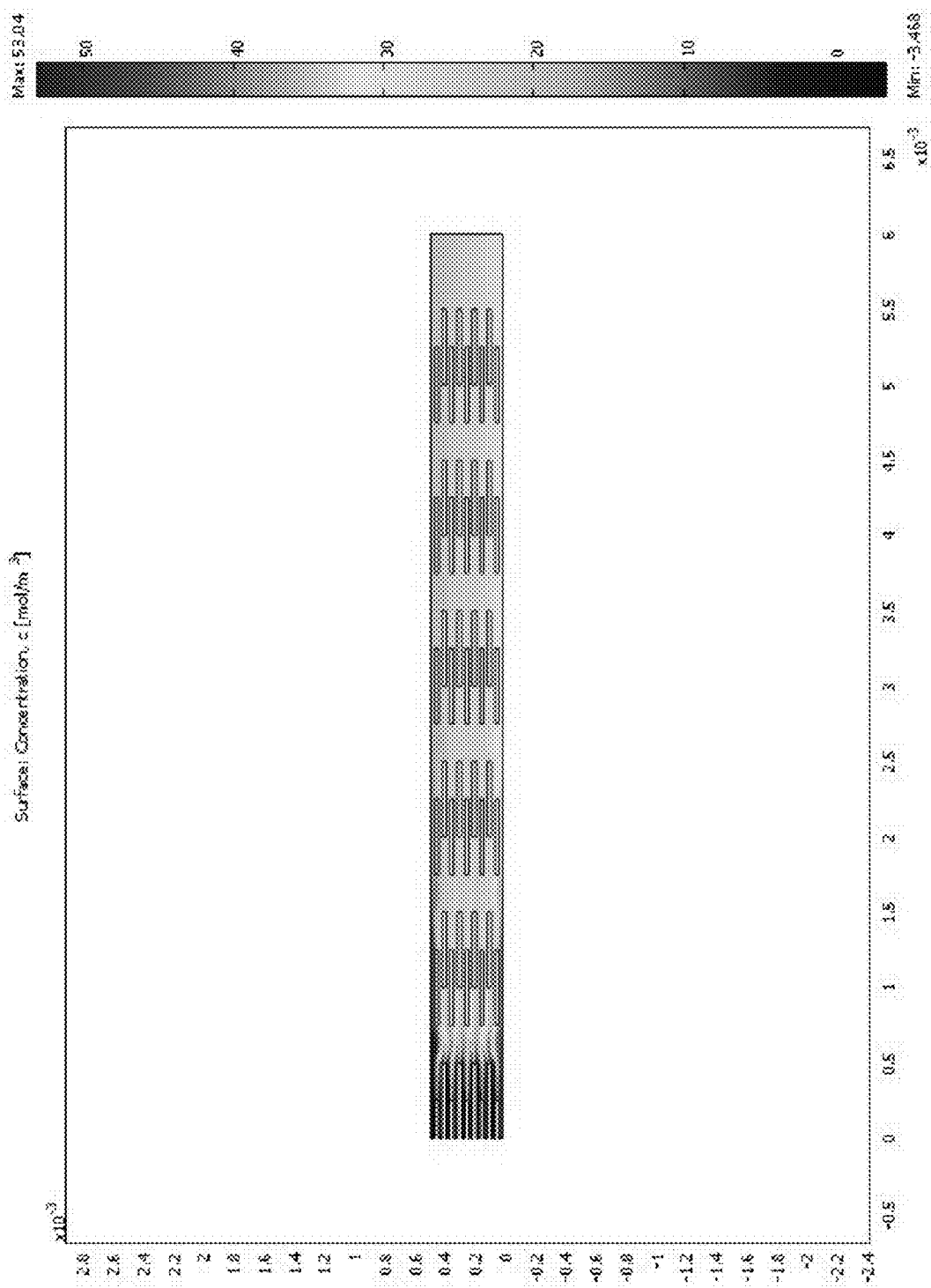
FIG. 14 shows a COMSOL plot showing a concentration profile.

COMSOL plots comparing the concentration profiles for the standard interdigital micro-mixer and the column micro-mixer, thereby demonstrating mixing efficiencies, are shown in FIGS. 13 and 14.

Figure 15:
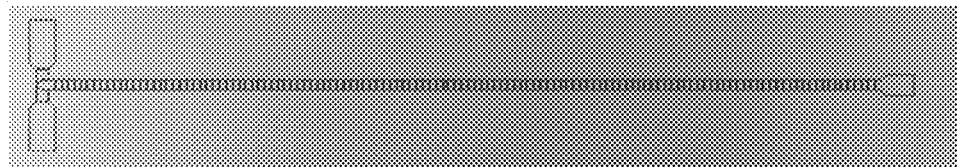
FIG. 15 shows an interdigital micro-mixer column design.
Figure 16:
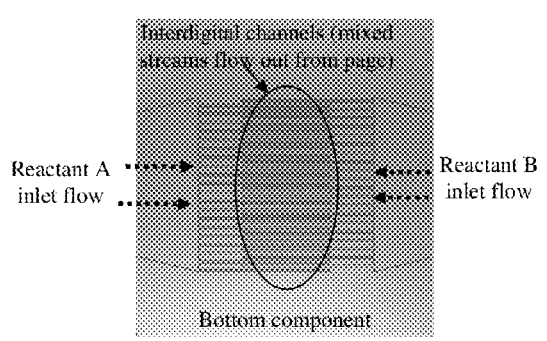
FIG. 16 shows an interdigital micro-mixer.
Figure 17:
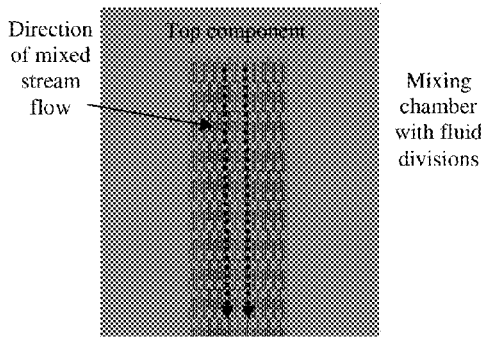
FIG. 17 shows an interdigital micro-mixer.
Figures 18, 19:
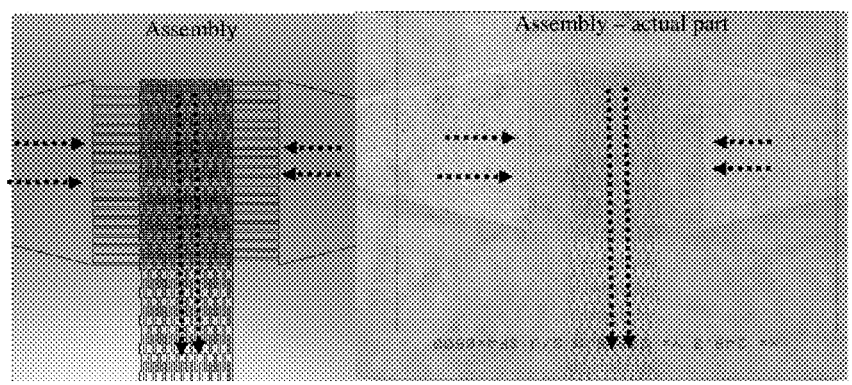
FIG. 18 shows an interdigital micro-mixer.
FIG. 19 shows an interdigital micro-mixer.

A long column design is shown in the FIG. 15. The interdigital micro-mixer column design can be fabricated with several short column parts and an array of the long column design of FIG. 15 can be constructed. This design may be particularly well suited for transesterfication of oils (i.e., biodiesel production).

If desired an unequal flow ratio device for diluting a concentrate, multistage designs for multiple operations, polymer and composite constructions, and testing devices can be configured for specific applications.

An example planar design can be fabricated (using both SU-8 molding and a triple transfer embossing technique) as shown in FIGS. 16-19. The interdigital bottom component is a well published embodiment, with the interleaved left and right mixed streams in the figure flowing perpendicular out from the page into a relatively large mixing chamber. The design below divides the streams after mixing to maintain thin film fluid layers, thereby reducing diffusion limitations and enhancing mixing.

Microscale Reactor

Figure 20:
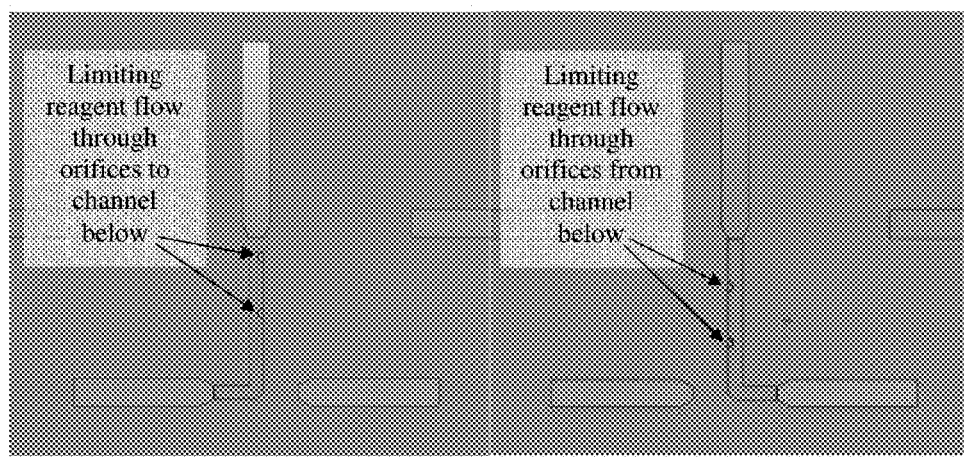
FIG. 20 shows a microscale reactor.

This design is a microscale reactor that enables applications including mixing of reactants with different viscosities, mixing immiscible liquids (for either liquid-liquid reactions or creating emulsions), gas-liquid mixing, and controlled incremental introduction of limiting reagents. The design shown in FIG. 20 includes a layout method that serves to eliminate a separate processing step (and therefore cost) for defining the orifices.

Figure 21:
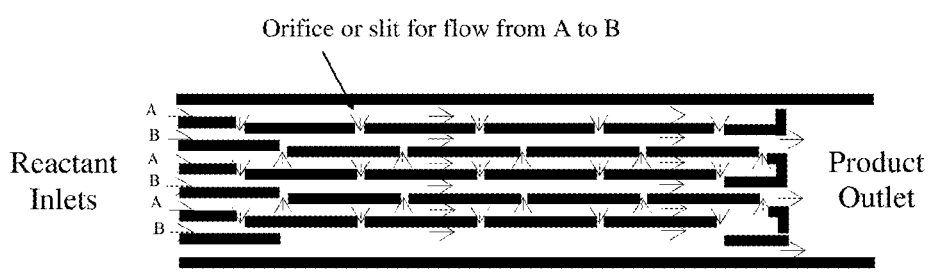
FIG. 21 shows a schematic view of fluid flow through a microscale reactor.

A schematic cross section view of the fluid flow is shown in FIG. 21. By introducing the limiting reagent periodically (though spacing of the orifices), a continuous flow multistage reactor is created. Spacing of the orifices can be calculated from reaction rates and residence times. While this design shows only two component system, multiple streams can be accommodated just as easily. Additionally, the laminated architecture allows coupling of different devices within the same device body, e.g., column mixers feeding microscale reactors.

Figure 22:
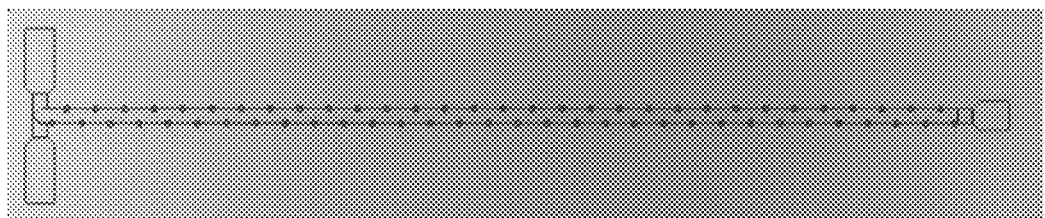
FIG. 22 shows a microscale reactor.

Desirably, the embodiment shown in FIG. 22 can function as a glycerol to methanol reactor.

Development for the microscale reactor can include graduated introduction designs for specific applications and multistage devices. Additionally, designs to reduce manufacturing costs by using polymers and higher device densities can be utilized.

Figure 23:
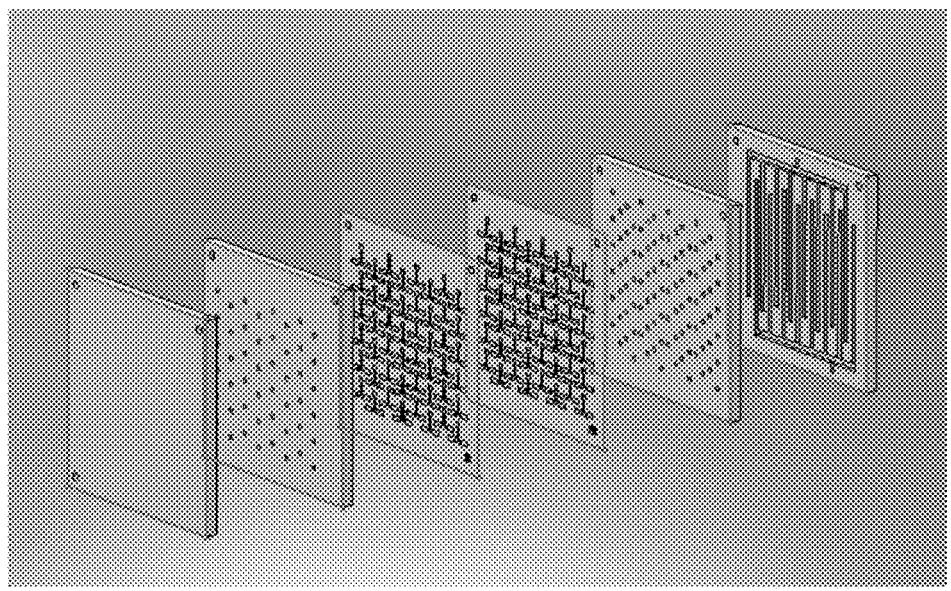
FIG. 23 shows an exploded view of an interdigital micro-mixer.

Architecture for Fluidic Interconnections for Arrays of Interdigital Micro-Mixers This architecture provides fluidic connections to many individual devices placed in a dense array. This allows predictable scaling from an individual device of both performance and manufacturing. This architecture shown in FIG. 23 can be used for many microchannel device designs, including those described above and below, in both metal and polymer materials.

Further development of the arrayed architecture includes increasing the density of devices, simplifying the plate stack, and constructing devices in polymer material.

Integrated Micro-Mixer and Jetting Device

Figure 24:
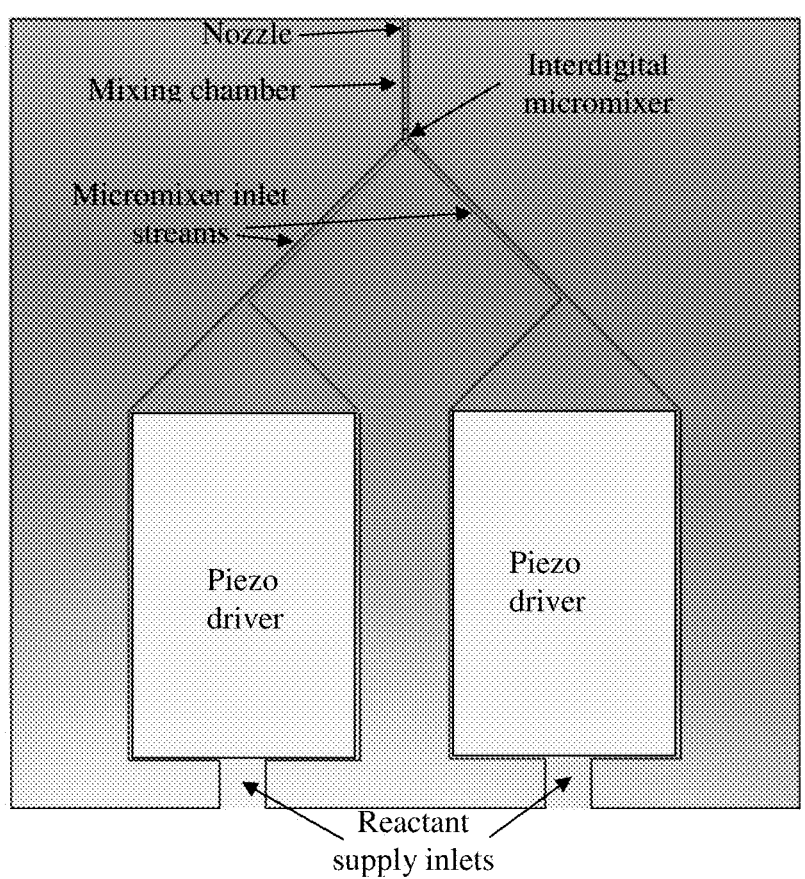
FIG. 24 shows an interdigital mixing device with active fluid drivers.

This device combines the interdigital mixing device with active fluid drivers to create a drop-on-demand chemical deposition device. Mixing or reacting chemical streams just prior to ejection allows deposition of short-lived or unstable reaction products (for example, silver nanoparticles). FIG. 24 shows a schematic view of an embodiment.

Figure 25:
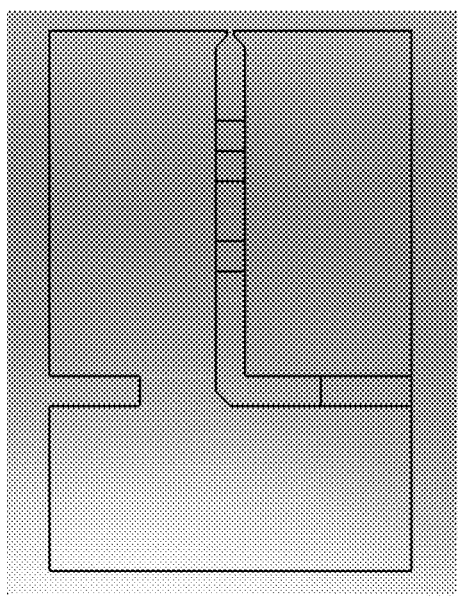
FIG. 25 shows a two component stack of an interdigital mixing device.
Figure 26:
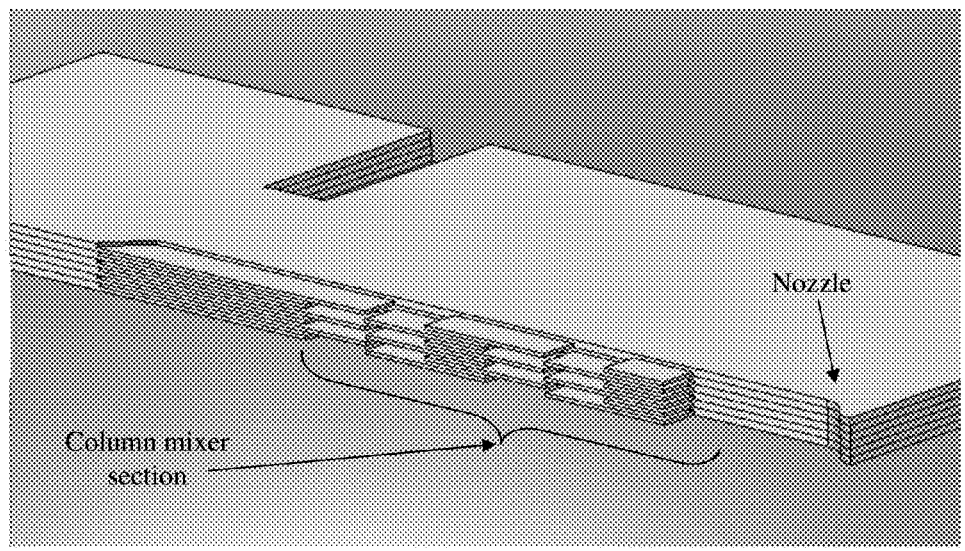
FIG. 26 shows a cross section view of a column mixer with a nozzle portion.

More mature designs include designed bores for droplet size control and a design where the streams merge at the nozzle exit (mixing occurs in the droplet in flight and on the substrate after deposition). Examples of these are discussed below. FIG. 25 shows the construction of a two component stack. Reactants enter from the side inlets, are mixed through a column mixer construction then jetted out a designed nozzle. FIG. 26 shows a cross sectional view showing the details of the column mixer portion and the nozzle.

Figure 27:
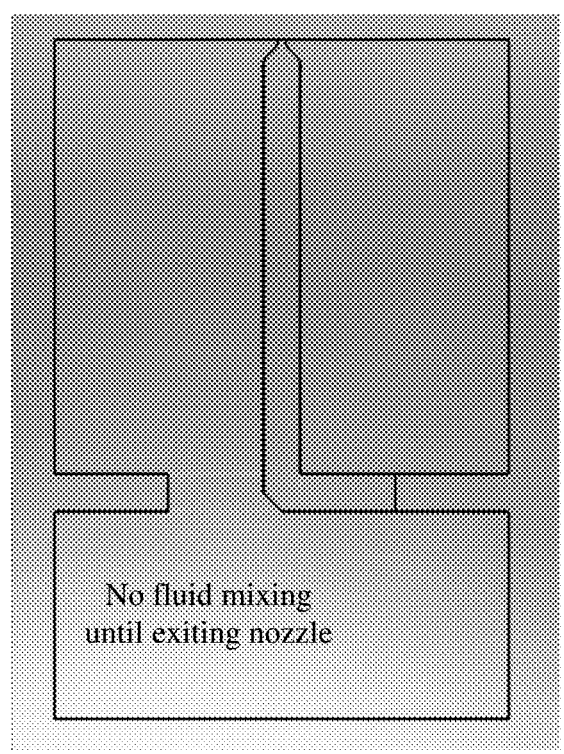
FIG. 27 shows an embodiment of a micro-mixer.
Figure 28:
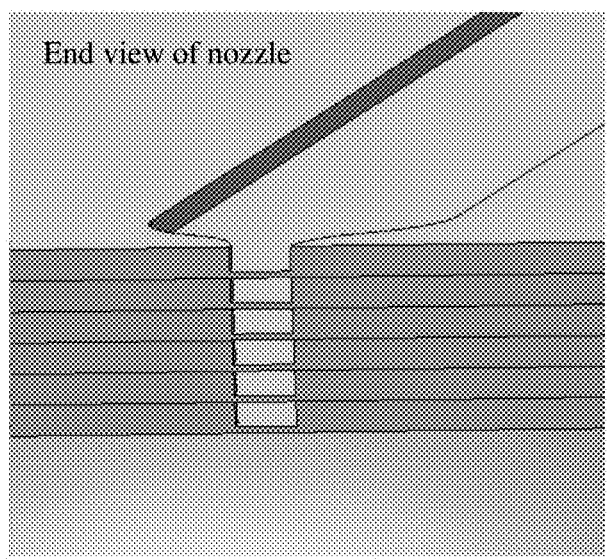
FIG. 28 shows an embodiment of a micro-mixer.

FIGS. 27 and 28 show an embodiment where the fluids do not mix until they leave the nozzle. Miscible fluids will coalesce into a single droplet in flight. This phenomenon is well characterized by the inkjet printing industry. By using methods such as differential chemical etching, the dividers between the channels can be very thin, thereby enhancing the coalescence of the droplets.

Future developments can include prototyping of externally driven devices. For example, integrated pulse drivers can be utilized. Externally driven devices can include nozzle bore, reaction chamber characterization, "mix in flight" designs, and composite polymer and metal constructions.

Nanoparticle Generator

This device is an integration of an interdigital micro-mixer with an internal nozzle array. Reactant or emulsion fluid droplets are pulsed from the nozzles into excess reactant or continuous phase stream using a driver such as a piezo micropump. The driver may be integrated into the device or external to the device. This device can be used to generate nanoparticles, emulsions, or controlled reactions of immiscible reactants by jetting small (picoliter) reactant droplets into a fluid or reactant in excess. By creating a stream of consistently sized droplets, continuous, precision methods for making nanoparticles and microemulsions can be realized. The device can include subsequent micromixing stages to quench reactions, or complete additional reaction steps. The device architecture lends itself to multiple reaction stages within one small device. For example, precursor reactants may be mixed prior to jetting into subsequent fluid streams.

Figure 29:
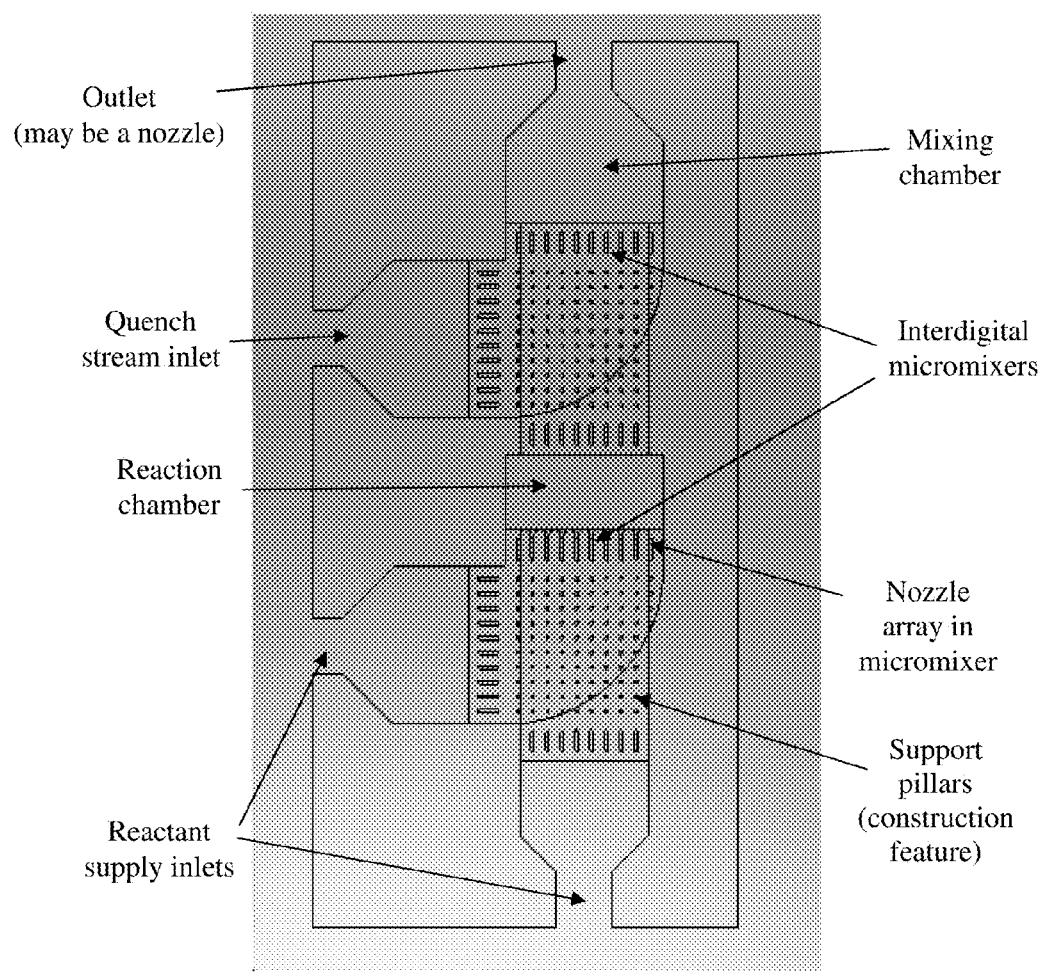
FIG. 29 shows a multi-nozzle micro-mixer.
Figure 30:
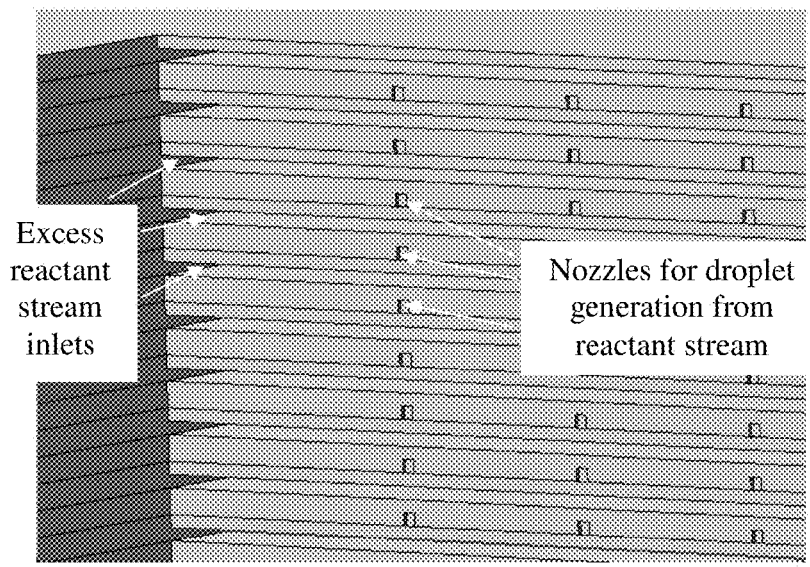
FIG. 30 shows a partial perspective view of a multi-nozzle device.

FIG. 29 shows the construction of a multi-nozzle design. FIG. 30 shows a perspective view looking back towards the exit from the nozzle array.

FIGS. 31-35 show the components of a two stage single nozzle device. The layers are stacked to form the construction. With respect to figure orientations below, the nozzle fluid enters from the bottom plenum, the first stage fluid enters from the right plenum, the second stage fluid enters from the left plenum, and the mixture exits from the top plenum.

Figure 36:
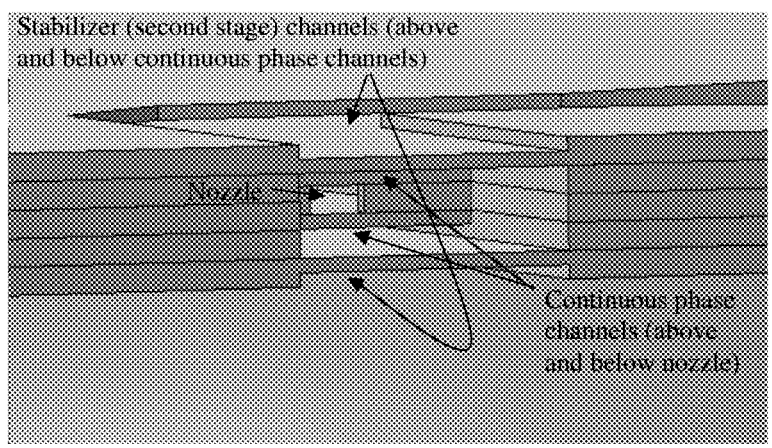
FIG. 36 shows a schematic perspective view of a micro-mixer.

FIG. 36 shows a perspective view looking back towards the exit from the nozzle assembly.

A single layer device has been created using soft lithography, the details of which are shown in FIGS. 37 and 38, as well as a still picture of the device in operation. The device is creating a microemulsion of water in oil.

Figure 39:
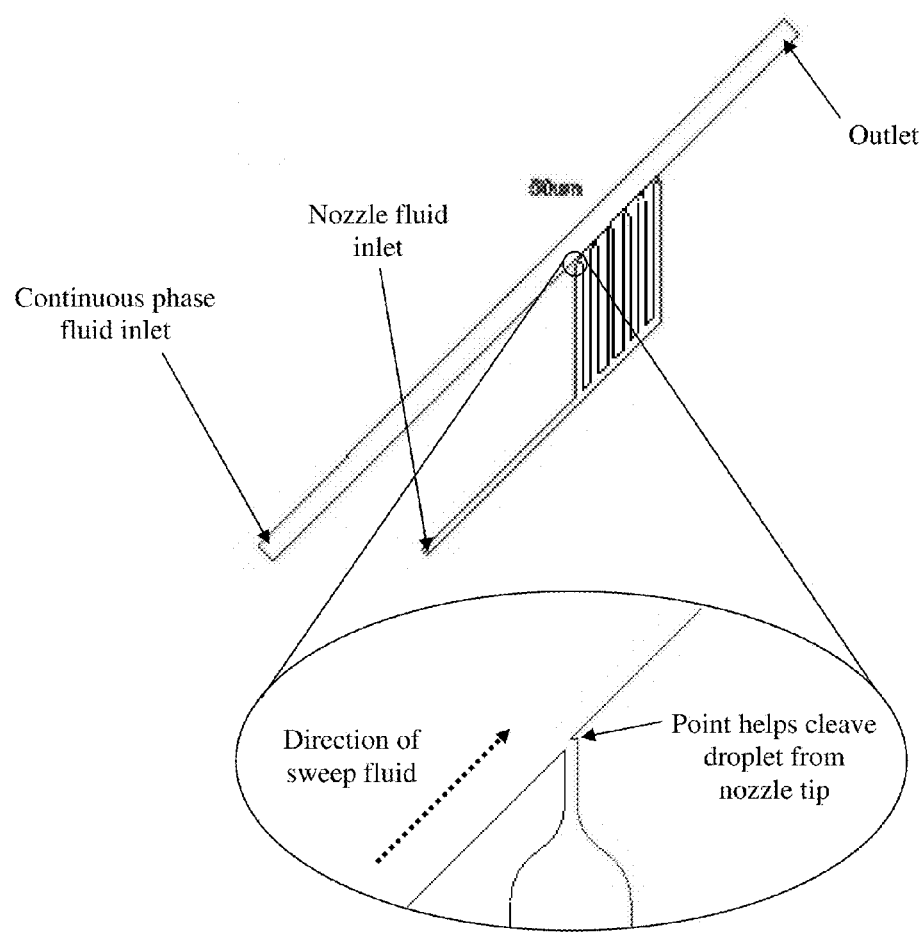
FIG. 39 shows a micro-mixer with a nozzle in a planar device.

An alternate design that is amenable to creating a dense array of nozzles in a planar device is shown in FIG. 39.

Figure 40:
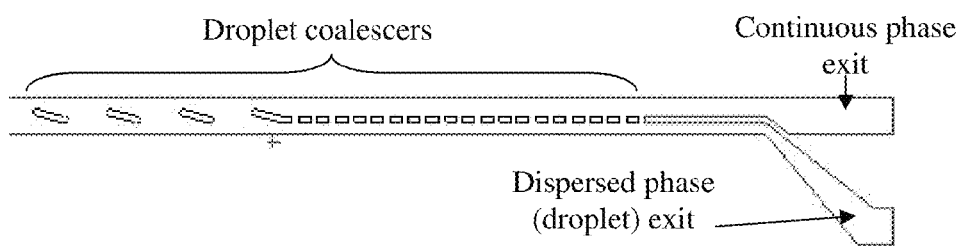
FIG. 40 is a schematic view of a micro-mixer.

FIG. 40 shows coalescing and separation stages that have been added and are can be used in PDMS structures.

Figure 41:
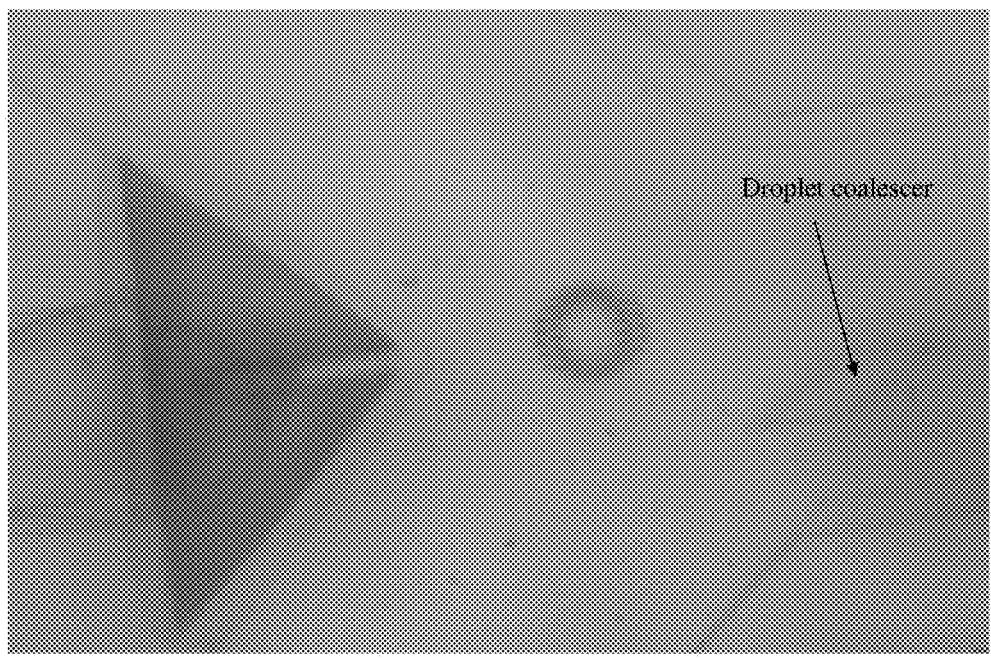
FIG. 41 shows a view of a portion of a micro-mixer.

A dual layer device using a thin kapton piece sandwiched between PDMS layers. A laser cut in the kapton creates the nozzle (see FIG. 41).

Figure 42:
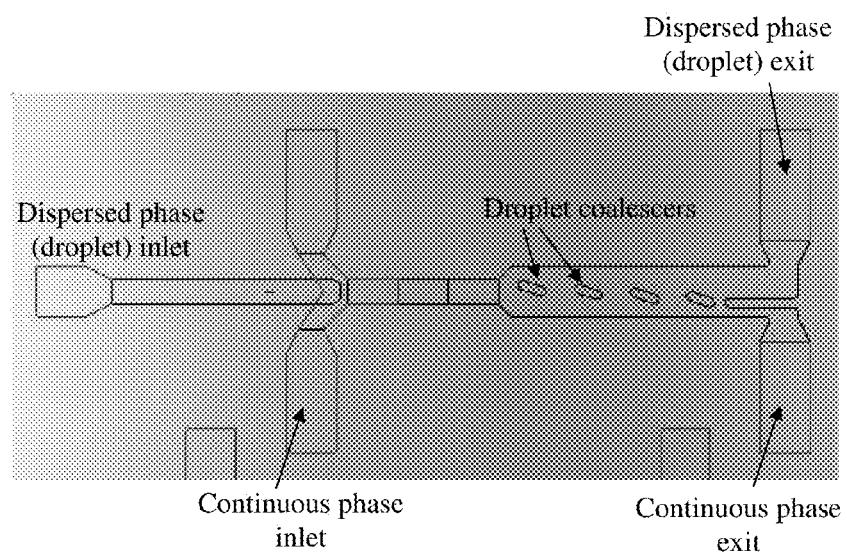
FIG. 42 is a schematic view of a micro-mixer.
Figure 43:
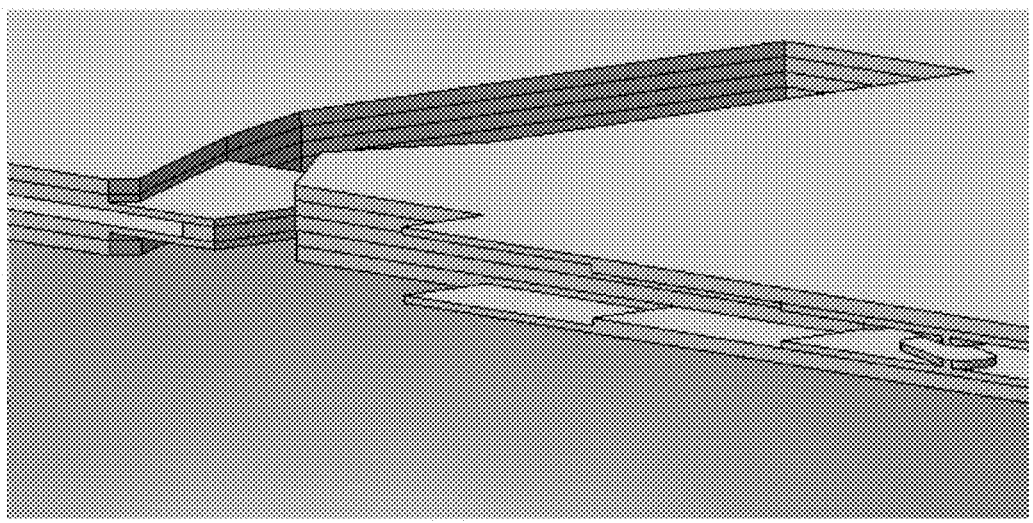
FIG. 43 is a partial perspective view of a micro-mixer.

This design has also been applied to metal laminae construction as shown in FIGS. 42 and 43.

Development of this device can be performed in multiple stages. First, fluid flow can be characterized using non-reactive systems. Second, specific reaction chemistries can be developed with the design being refined as needed for each specific application. In addition, a full system for precision deposition of nanomaterials can be constructed.

Mixing Chamber Flow Paths with Multiple Mixing Chambers

Figure 44:
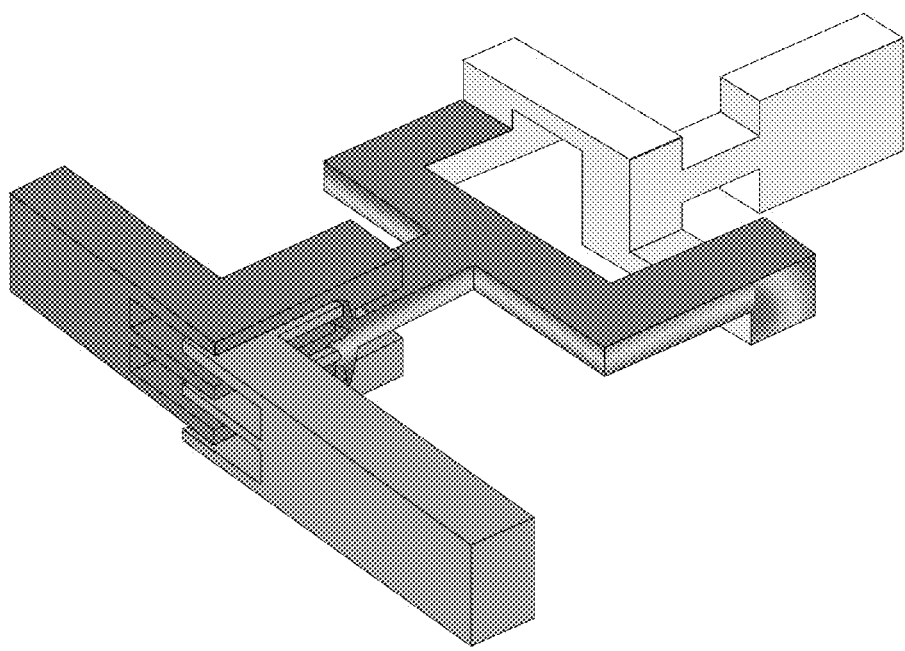
FIG. 44 is a COMSOL plot of an apparatus having a mixing chamber flow path that separates and recombines along its length.

FIG. 44 illustrates an apparatus with a plurality of microchannels that are configured to receive a first fluid and a plurality of microchannels that are configured to receive a second fluid. As shown in FIG. 44, the first and second fluids have respective outputs that deliver the fluids into a mixing chamber flow path. The mixing chamber flow path has a first mixing chamber, then the mixing chamber flow path splits into two different flow paths that are recombined downstream at a second mixing chamber.

A COMSOL concentration plot of the apparatus illustrates that the separation and recombination of the mixing chamber flow path (as shown in FIG. 44) can result in improved mixing performance. Table 1 below quantifies the mixing quality of this structure, with mixing quality being calculated as surface integral of $(c-c0/2)2$ at exit (a zero value represents perfect mixing). For reference, similar structures without the separation and recombination of the mixing chamber flow path generally result in mixing quality values of 0.0135 or higher.

TABLE 1

| Internal Volume, µl | Viscosity, cP | Pressure, Pa | MQ | V, ml/min | Residence time, ms | Re |
|---|---|---|---|---|---|---|
| 12.3346 | 20 | 34,473 | 0.0044627 | 13.72 | 0.90 | 26 |

Figure 45:
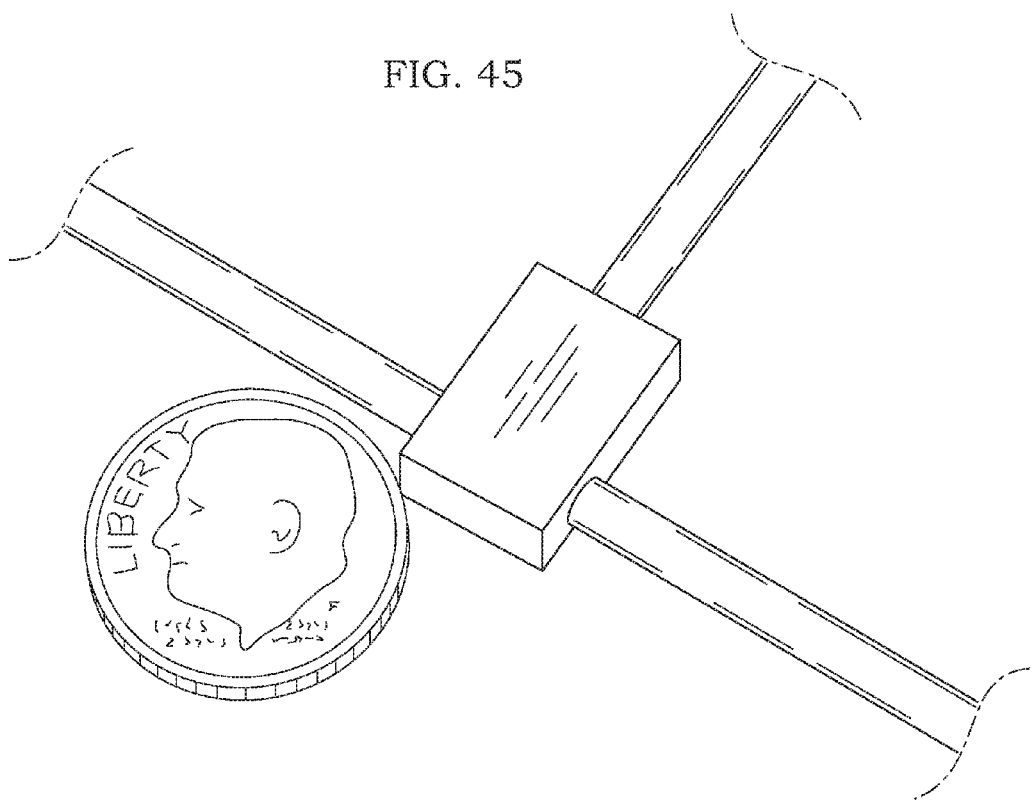
FIG. 45 is a photograph of an exemplary device of the type shown in FIG. 44.

FIG. 45 is a photograph of a device that is similar to that which was plotted in FIG. 44. The inclusion of the coin provides a size reference to illustrate one possible device size that can be achieved.

Figure 46:
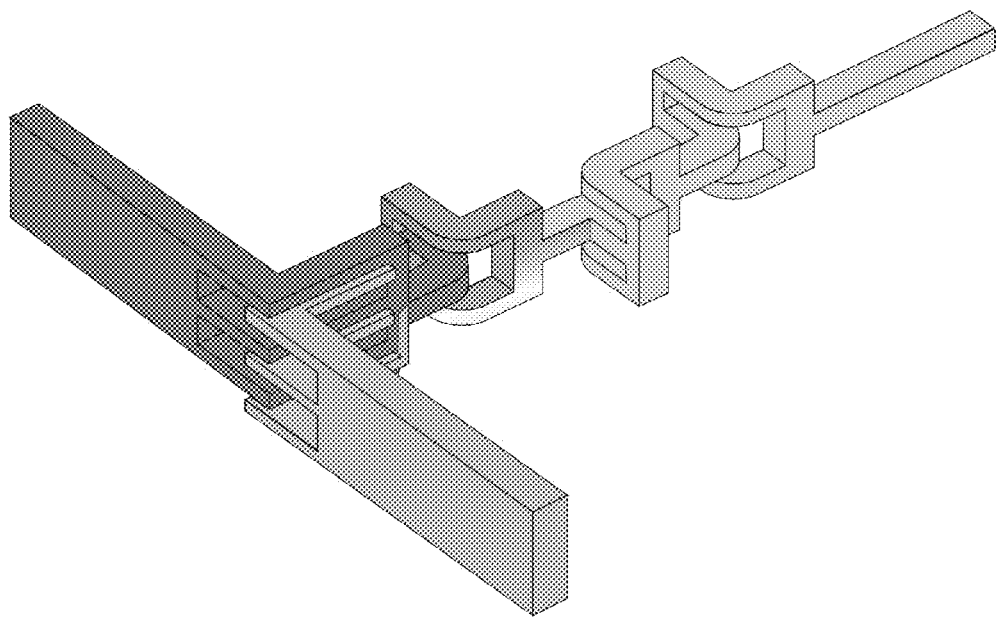
FIG. 46 is a COMSOL plot of another exemplary apparatus that has a mixing chamber flow path that separates and recombines along its length.

FIG. 46 illustrates another apparatus with a plurality of microchannels that are configured to receive a first fluid and a plurality of microchannels that are configured to receive a second fluid. As shown in FIG. 46, the first and second fluids have respective outputs that deliver the fluids into a mixing chamber flow path. The mixing chamber flow path shown in FIG. 46 has a first mixing chamber, then the mixing chamber flow path repeatedly splits into multiple different flow paths that are recombined downstream at a plurality of mixing chambers. As shown in FIG. 46, recombination of the different flow paths along the mixing chamber flow path is achieved by folding the fluid streams such that outer wall boundary layers are introduced into the middle of the additional mixing chambers along the mixing chamber flow path.

A COMSOL concentration plot of the apparatus illustrates that the repeated separation and recombination of the mixing chamber flow path (as shown in FIG. 46) can result in further improved mixing performance. Table 2 below quantifies the mixing quality of this structure, with mixing quality being calculated as surface integral of $(c-c0/2)2$ at exit (a zero value represents perfect mixing).

TABLE 2

| Internal Volume, µl | Viscosity, cP | Pressure, Pa | MQ | V, ml/min | Residence time, ms | Re |
|---|---|---|---|---|---|---|
| 9.2654 | 20 | 34,473 | 0.0000292 | 4.34 | 2.14 | 12 |

Figure 47:
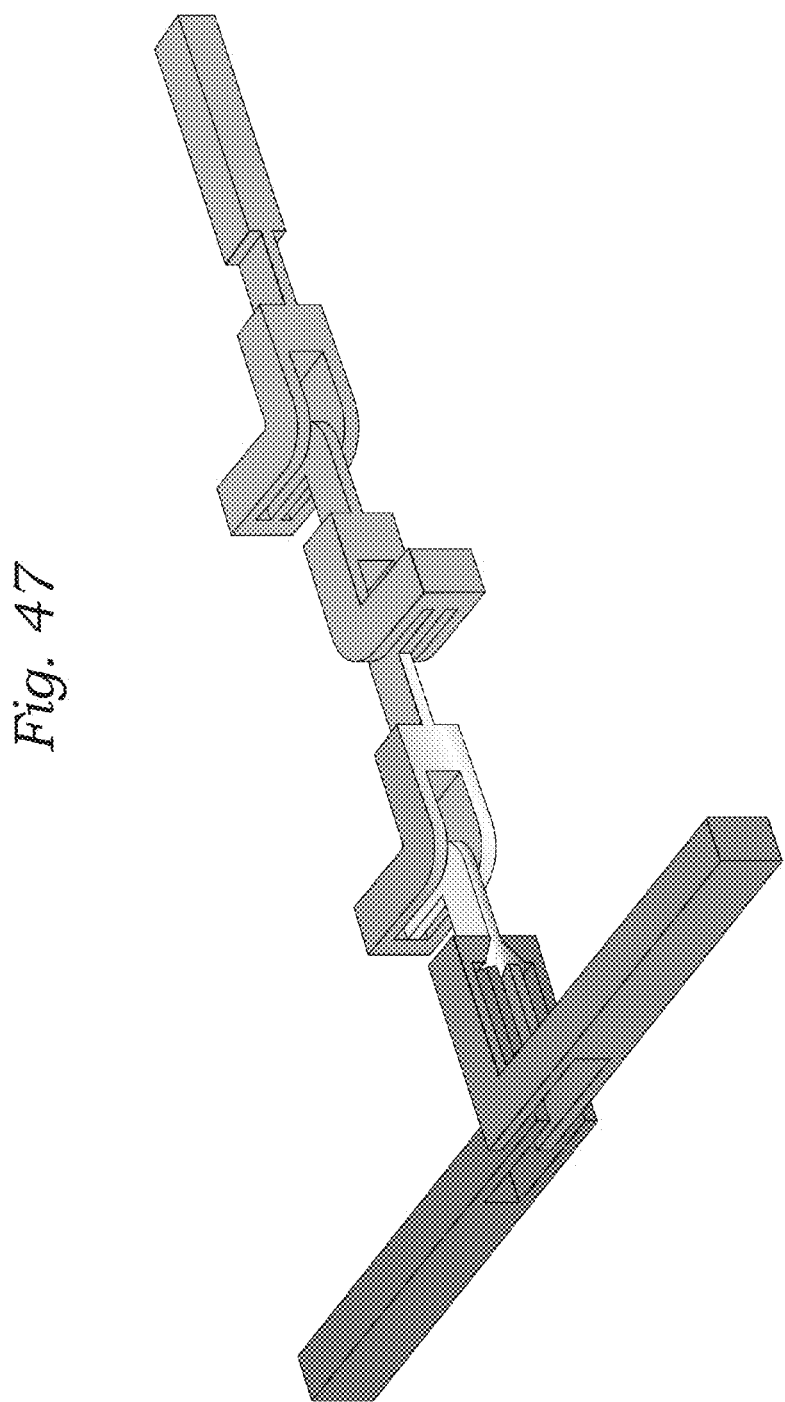
FIG. 47 is a COMSOL plot of another exemplary apparatus that has a mixing chamber flow path that separates and recombines along its length.

FIG. 47 illustrates an apparatus that is similar to FIG. 46. A COMSOL concentration plot of the apparatus shown in FIG. 47 illustrates that the repeated separation and recombination of the mixing chamber flow path can result in further improved mixing performance. Table 3 below quantifies the mixing quality of this structure, with mixing quality being calculated as surface integral of $(c-c0/2)2$ at exit (a zero value represents perfect mixing).

| Internal Volume, µl | Viscosity, cP | Pressure, Pa | MQ | V, ml/min | Residence time, ms | Re |
|---|---|---|---|---|---|---|
| 4.9709 | 20 | 34,473 | 0.0000211 | 0.68 | 7.29 | 2 |

Figure 48A:
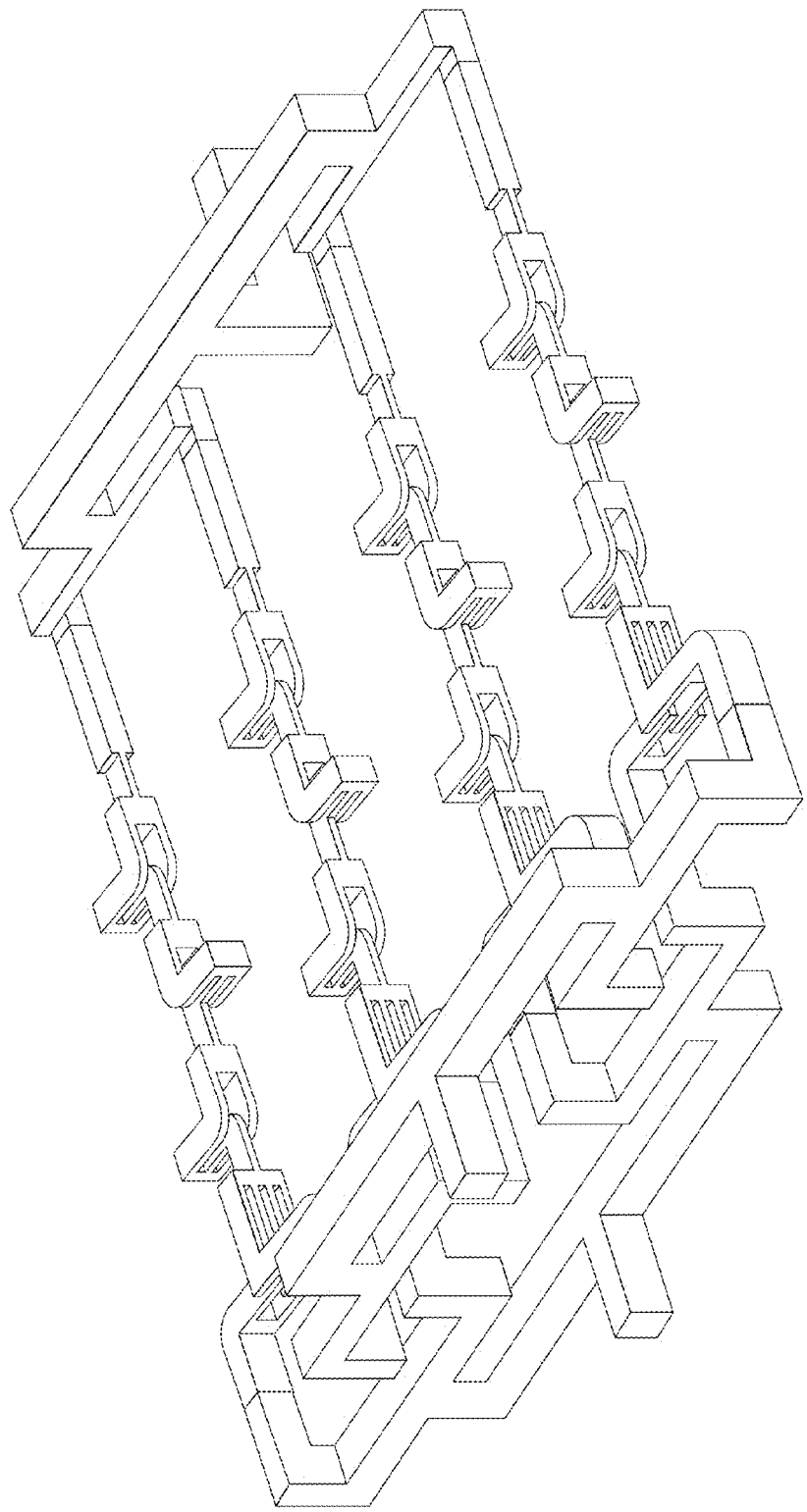
FIGS. 48A and 48B illustrate an exemplary apparatus with a plurality of mixing chamber flow paths that separate and recombine along their length.
Figure 48B:
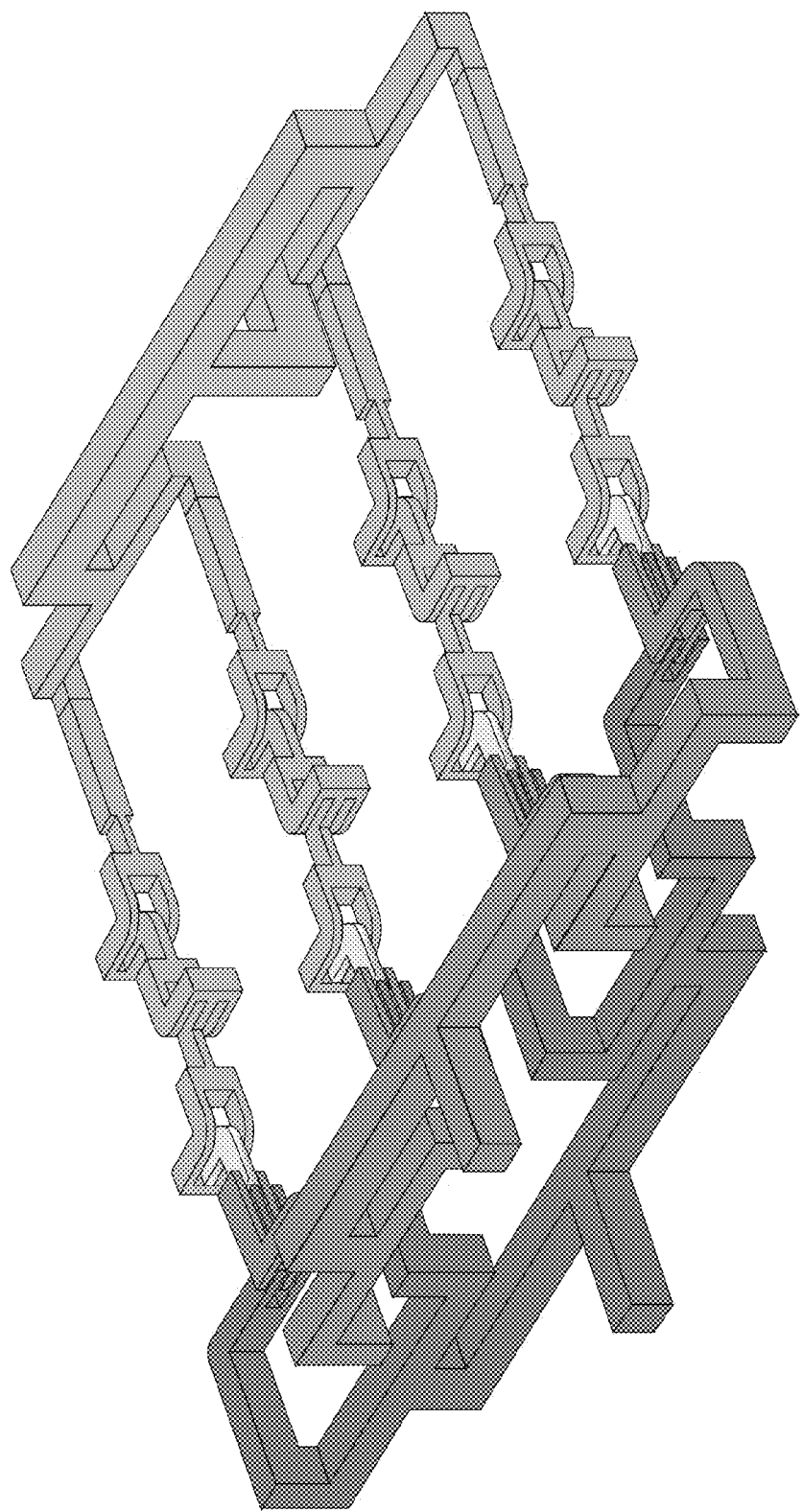

FIG. 48A illustrates an embodiment showing a plurality of integrated devices with mixing chamber flow paths that separate and recombine. The plurality of devices are laterally combined and, in the example shown in FIG. 48A, have four devices that are integrated together. As shown in FIG. 48A, each of the respective inputs of the first and second fluids split to feed the respective microchannel inputs for the various devices. FIG. 48B is a COMSOL concentration plot of the apparatus shown in FIG. 48A.

Figure 49A:
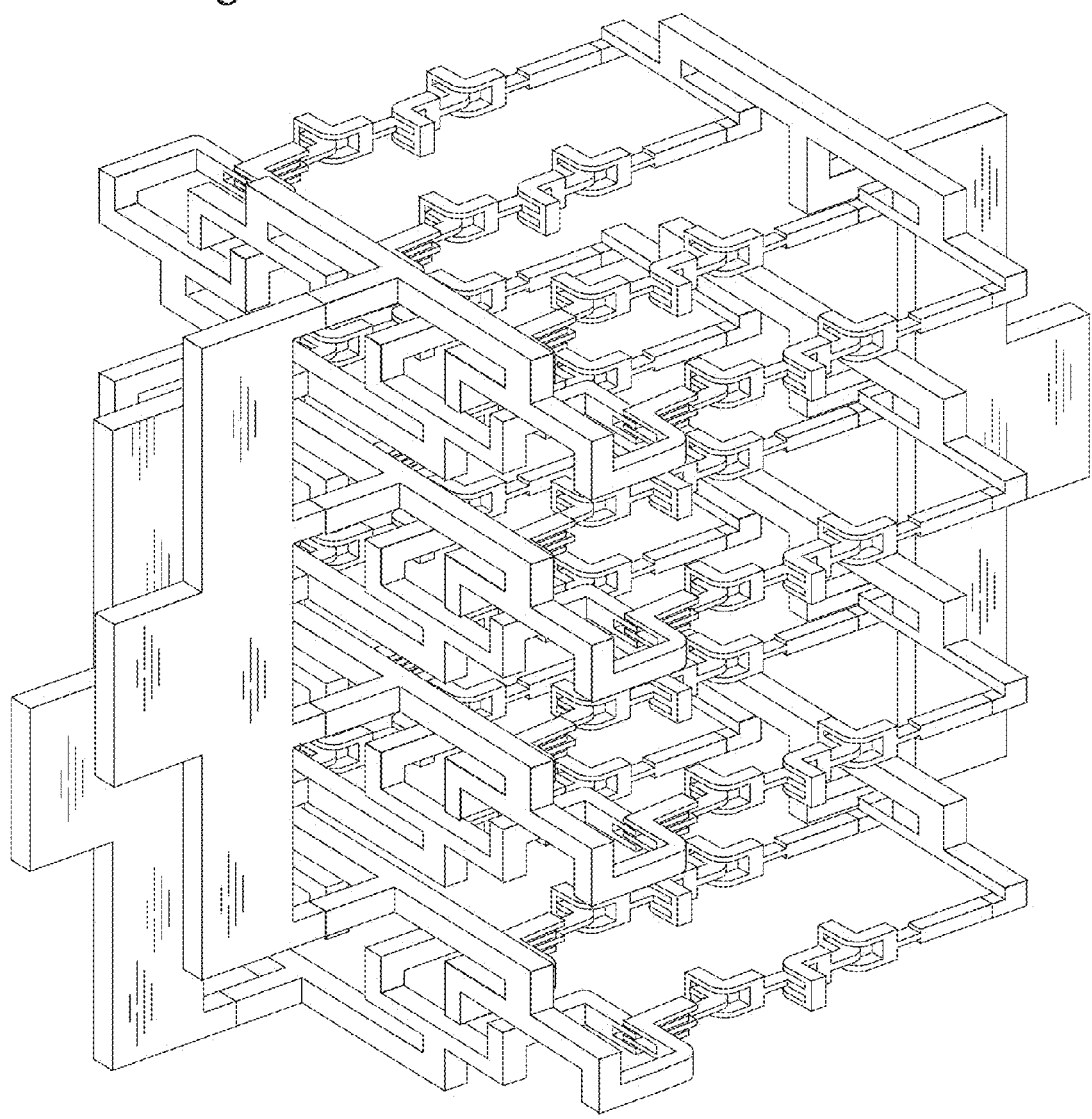
FIGS. 49A and 49B illustrate another exemplary apparatus with a plurality of mixing chamber flow paths that separate and recombine along their length.
Figure 49B:
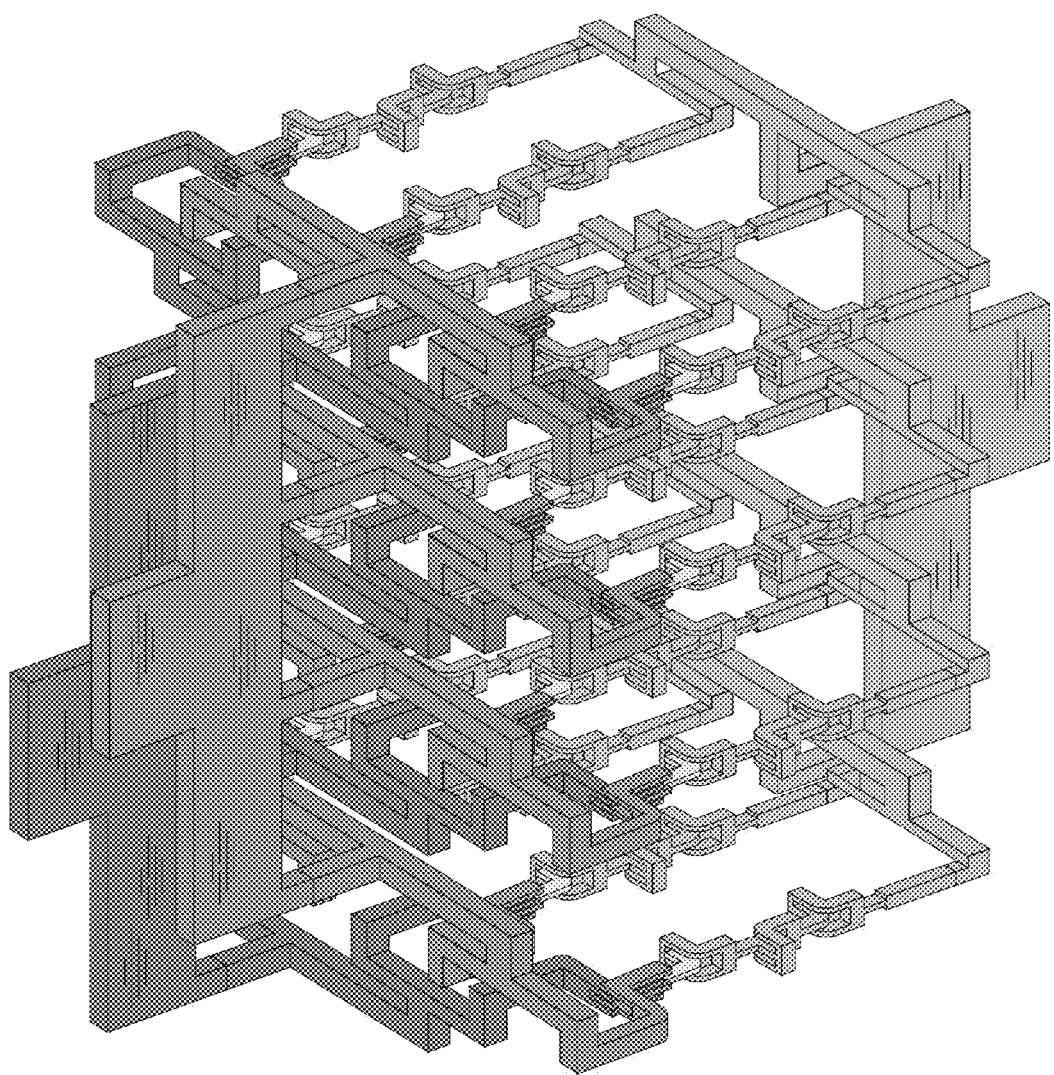

FIGS. 49A and 49B illustrate an embodiment wherein the integrated devices shown in FIG. 48A are stacked vertically, resulting in a greater number of integrated devices. As shown in FIG. 49A, the respective inputs of the first and second fluids can split (or otherwise be configured) to feed the respective microchannel inputs for the various devices. FIG. 49B is a COMSOL concentration plot of the apparatus shown in FIG. 49A.

Mixing quality of such integrated systems is very high. For example, mixing efficiency at the outlet of each mixer is ≤0.0001, as calculated by surface integration of outlet concentration variation $(c-c0/2)^2$ divided by average inlet concentration. In addition, at 5 psi driving pressure, flow through the 4× array (FIG. 48A) is 3.8× the single device and flow through the 4×4 array (FIG. 49A) is 14.5× the single device.

Figure 50A:
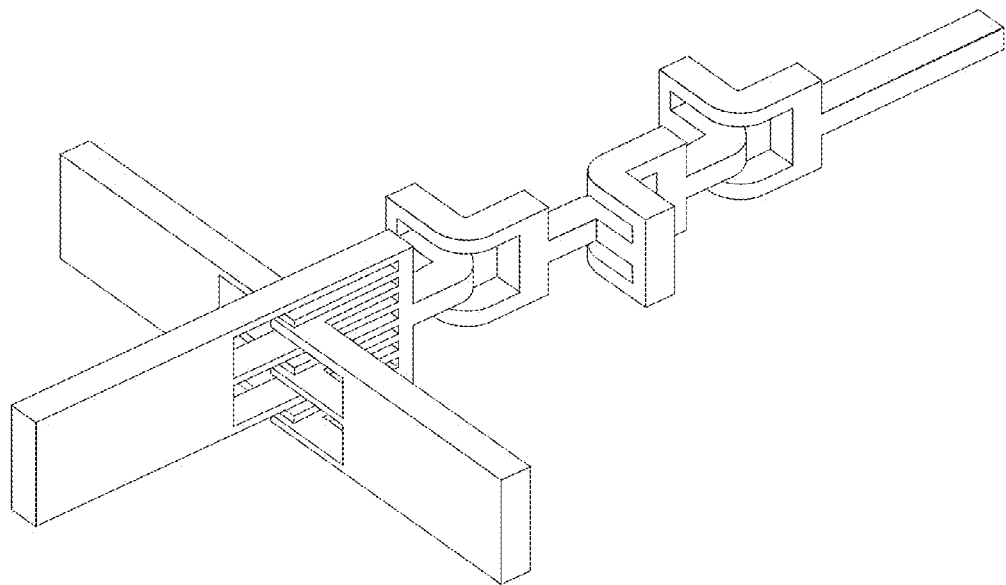
FIGS. 50A and 50B illustrate an exemplary apparatus that has at three fluid inlets.
Figure 50B:
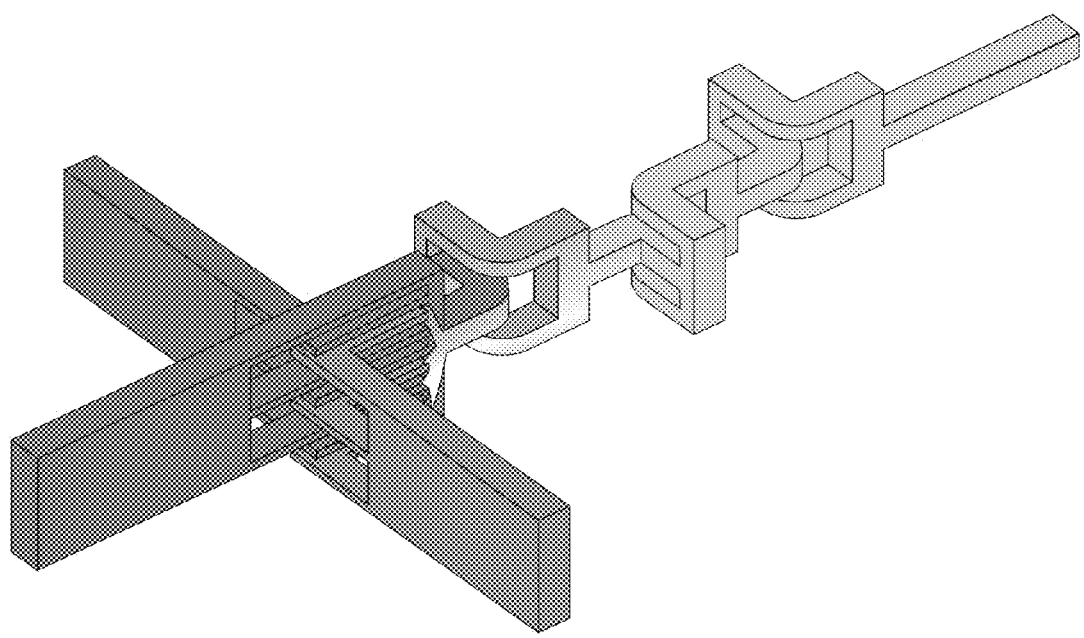

FIG. 50A and FIG. 50B (a COMSOL concentration plot of FIG. 50A) illustrate an embodiment similar to that shown in FIG. 46, except that a third fluid is introduced to the apparatus. As shown in FIG. 50A, a third fluid inlet is provided, with the third fluid inlet comprising a plurality of microchannels that are configured to have their respective outputs at the first mixing chamber along the mixing chamber flow path. Similar to the apparatus shown in FIG. 46, the apparatus of FIG. 50A has a first mixing chamber, then the mixing chamber flow path repeatedly splits into multiple different flow paths that are recombined downstream at a plurality of mixing chambers. In some embodiments, the recombination of the different flow paths along the mixing chamber flow path can be achieved by folding the fluid streams such that outer wall boundary layers are introduced into the middle of the additional mixing chambers along the mixing chamber flow path.

Figure 51:
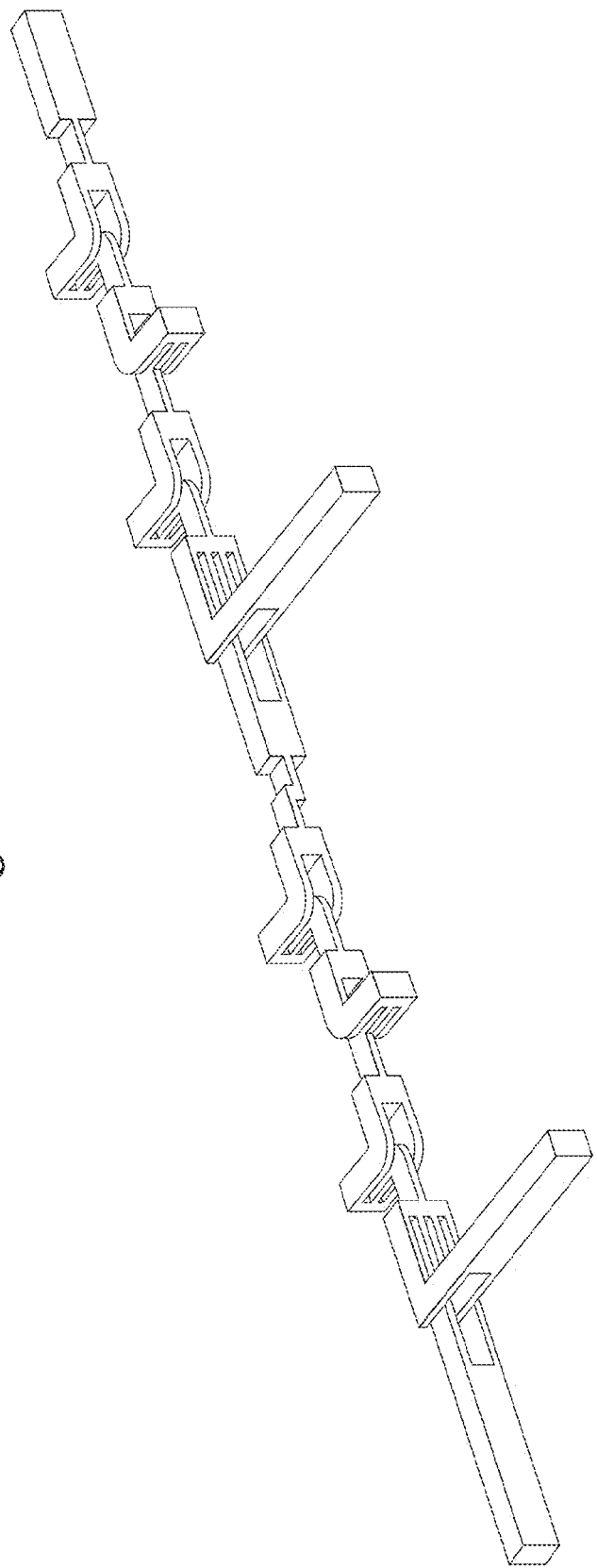
FIG. 51 illustrates an exemplary multi-stage apparatus.
Figure 52:
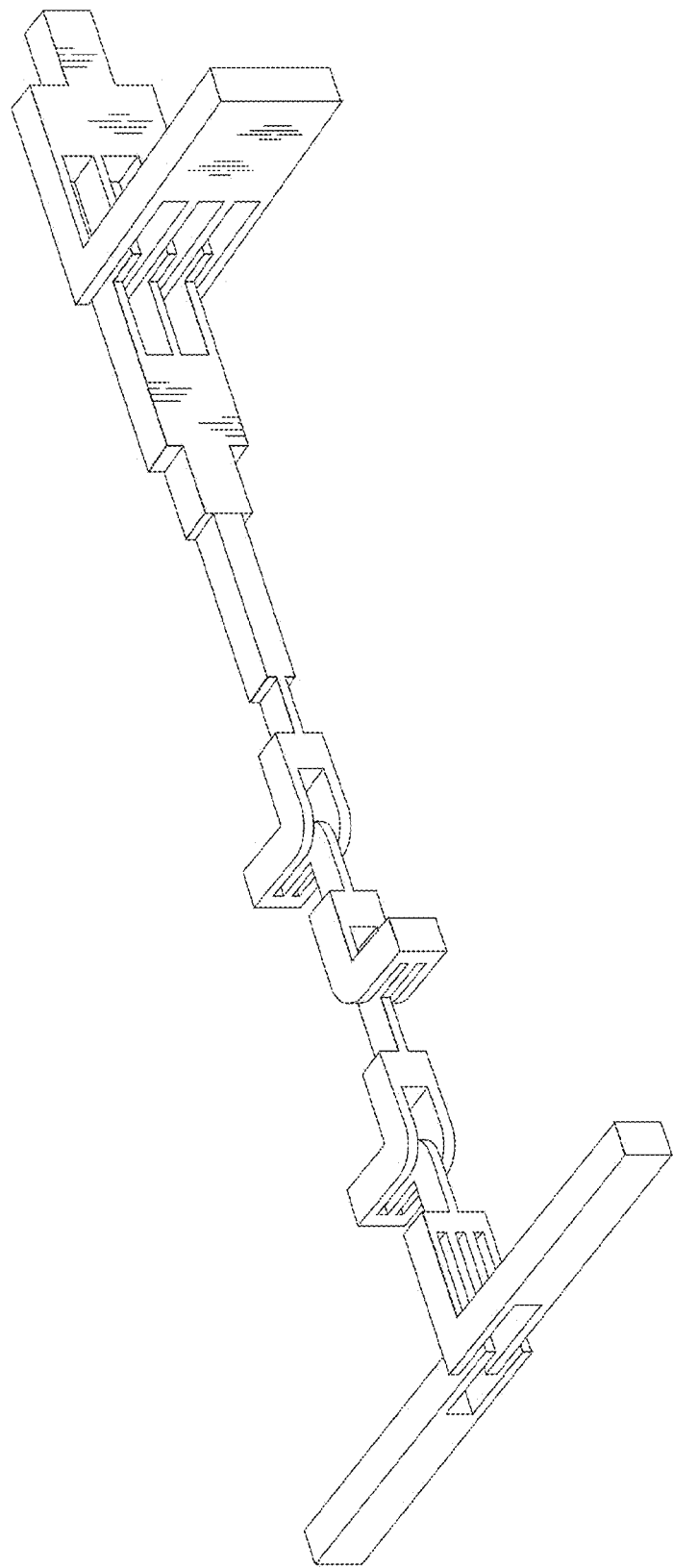
FIG. 52 illustrates another exemplary multi-stage apparatus, with one of the stages comprising a sheath flow device.

In some embodiments, the devices described herein can be combined to provide two or more different stages. FIGS. 51 and 52 illustrates different embodiments where devices have been combined to provide two stages. Although only two stages are shown in these figure and these figures illustrate specific devices in those two stages, it should be understood that any of the devices disclosed herein can be combined in any number to provide a plurality of different stages.

FIG. 51 illustrates an exemplary embodiment wherein the first stage comprises an apparatus similar to that shown in FIG. 46. A second apparatus can be sequentially combined with the first apparatus to provide a second stage of operation. In the exemplary embodiment, the second stage comprises an additional mixing device (like that shown in FIG. 46). Accordingly, the second stage is configured to mix the output of the first stage with another fluid (e.g., inlet 3). The fluid entering inlet 3 can be the same or different from that entering inlets 1 or 2. For example, in some embodiments, the fluid entering inlet 3 can be the same as the fluid exiting the first stage (e.g., it can comprise the result of another device's operation in mixing the two fluids that are mixed in the first stage).

FIG. 52 illustrates an exemplary embodiment wherein the first stage comprises an apparatus similar to that shown in FIG. 46 and the second stage is a sheath stage as discussed in more detail below (see FIGS. 55-58B).

Figure 53:
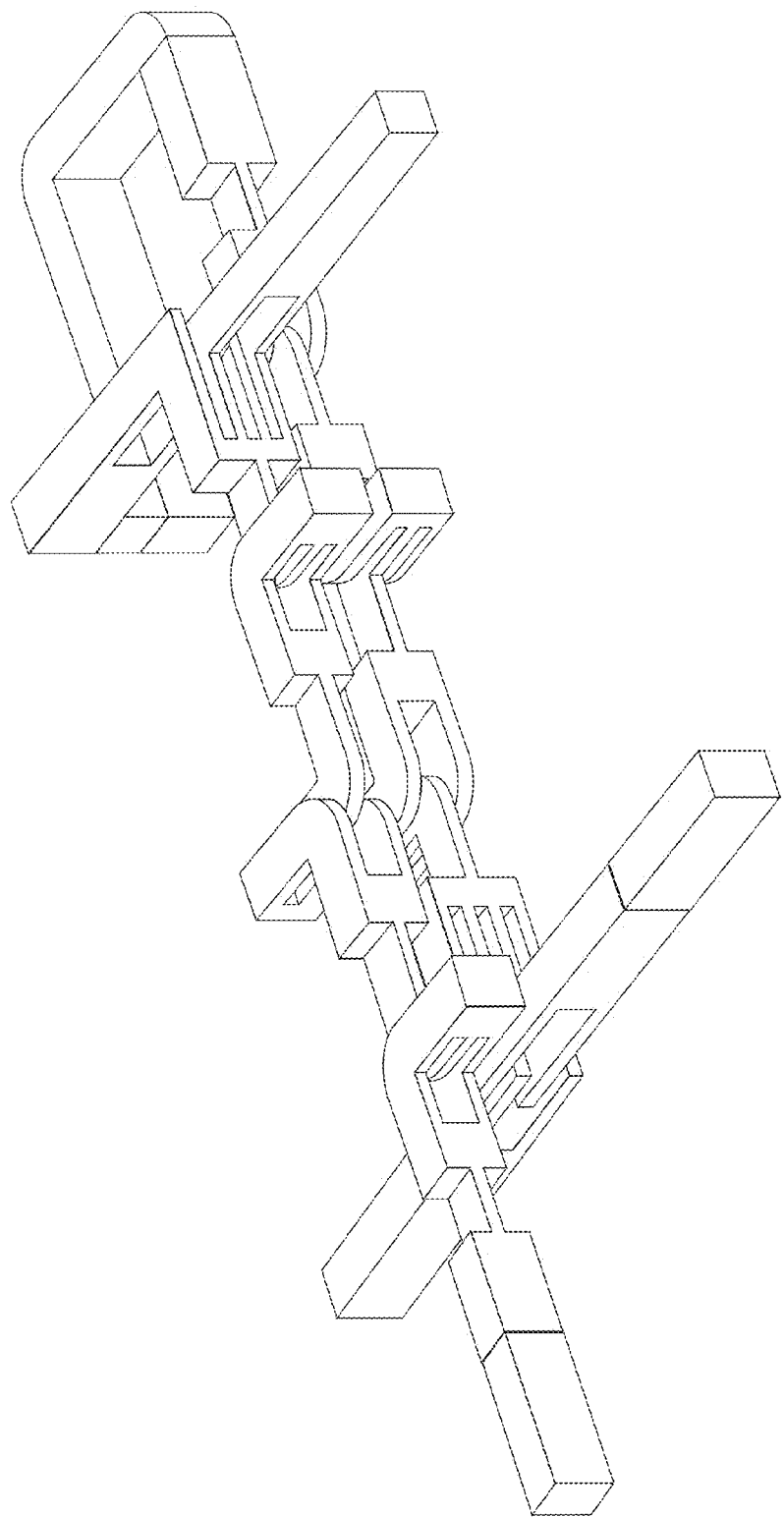
FIG. 53 illustrates another exemplary multi-stage apparatus, with at least some of the stages being vertically stacked.

FIG. 53 illustrates another exemplary embodiment of multiple mixing stages. In this embodiment, however the first and second stages are vertically stacked in sequence. Thus, for example, at two fluids can be delivered into inlets 1 and 2 and mixed as described elsewhere herein, then the fluids can be delivered to a different vertical level for delivery to another mixing device. In this embodiment, a third inlet is provided to deliver a third fluid (which can be same or different from the fluids delivered via inlet 1 and 2) for additional mixing.

Figure 54:
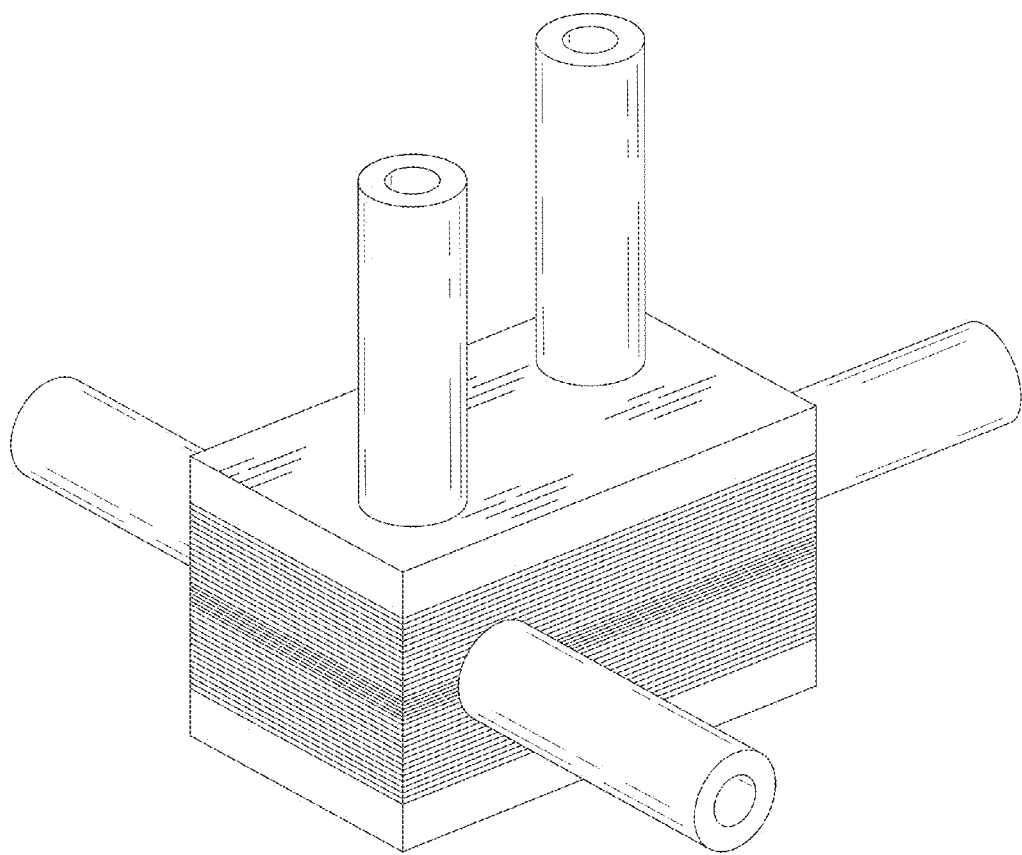
FIG. 54 illustrates an exemplary heat exchanger device.

FIG. 54 illustrates another embodiment wherein the apparatus comprises a mixer with multiple heat exchange layers. As shown in FIG. 54, fluids can be delivered into their respective inlets for mixing within the device and, ultimately, can be delivered out the outlet. Heat exchange layers can be provided adjacent to the mixing layers to transfer heat to or from the mixing layer via the heat exchanger fluid (HX fluid). It should be understood that the design of the mixing layer(s) can vary and any of the apparatuses described herein can form the basis of the mixing layer.

Figure 55:
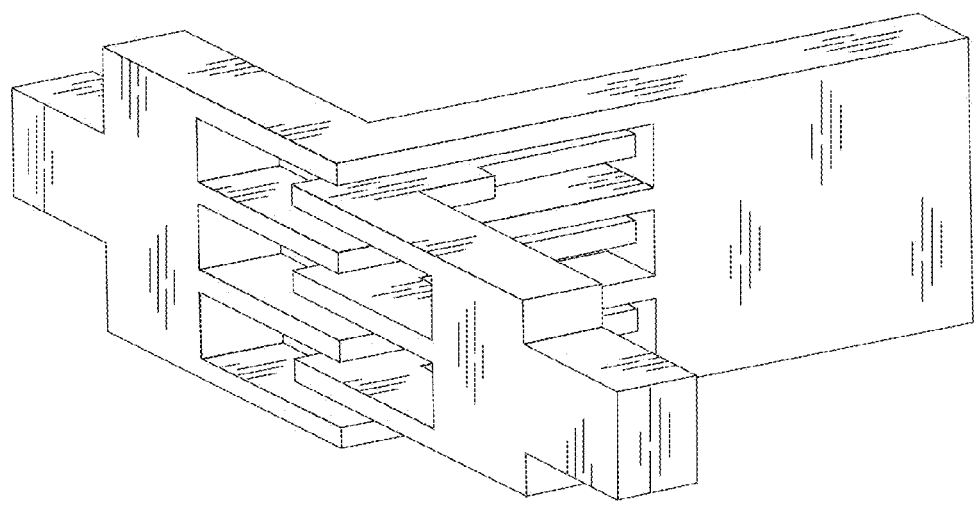
FIG. 55 illustrates an exemplary apparatus for achieving sheath flow.
Figure 56:
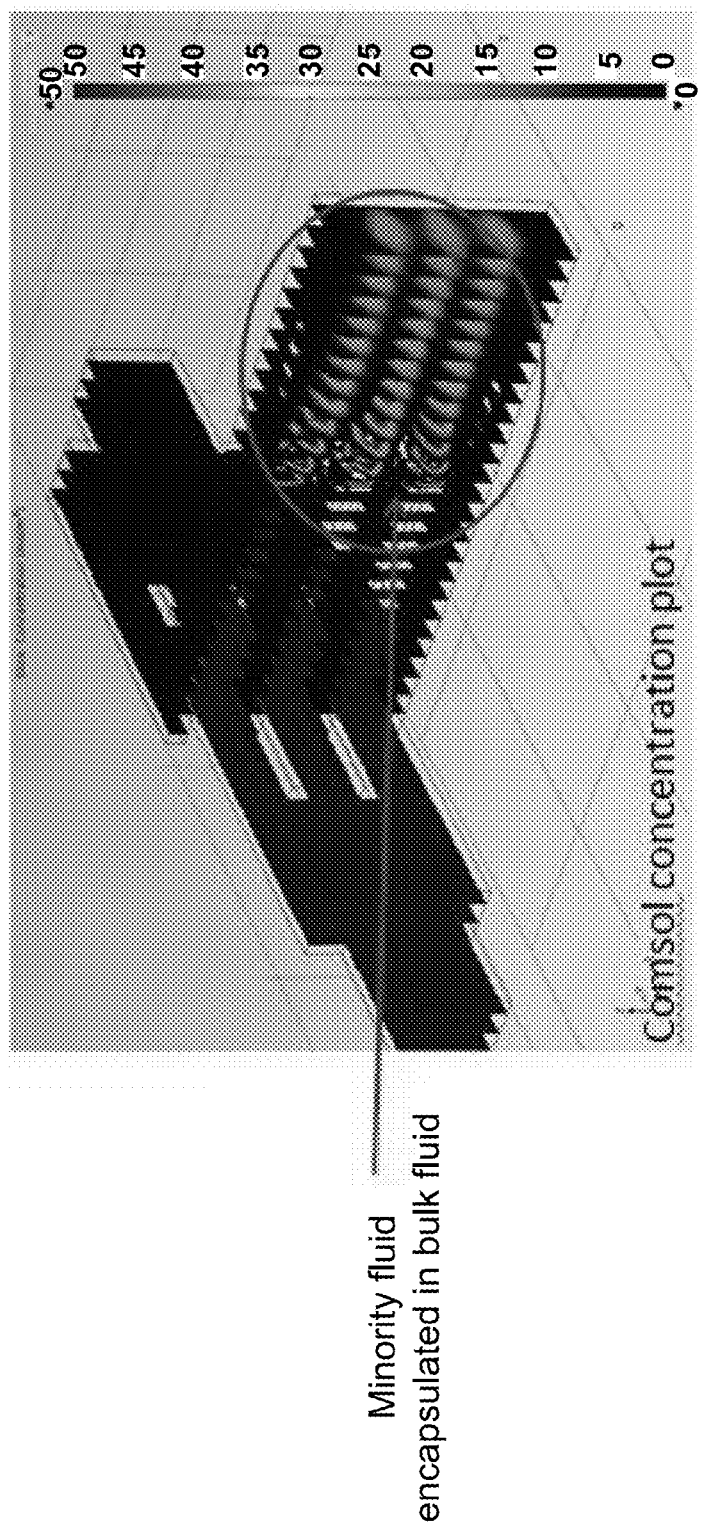
FIG. 56 illustrates a COMSOL plot of the device of FIG. 55.

FIG. 55 illustrates an embodiment in which multiple flows can be combined within a flow path to achieve sheath flow. FIG. 55 illustrates an embodiment wherein a bulk fluid can encapsulate a minority fluid. As shown in FIG. 56, which illustrates a segmented COMSOL plot, the minority fluid can be substantially fully encapsulated by the bulk fluid as the fluids exit their respective microchannel fluid outputs.

Figure 57:
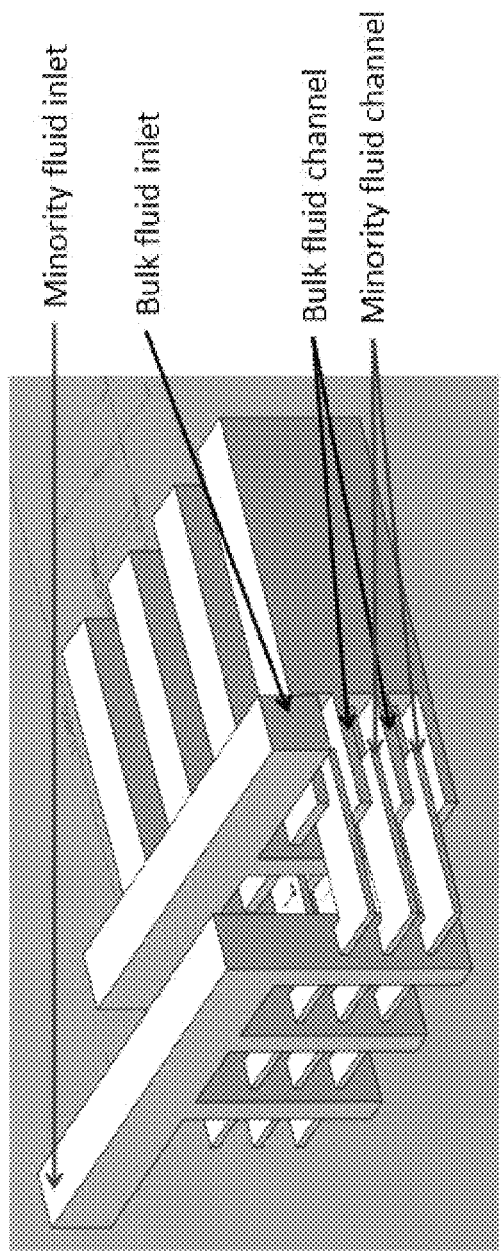
FIG. 57 illustrates another exemplary apparatus for achieving sheath flow.
Figures 58A, 58B:
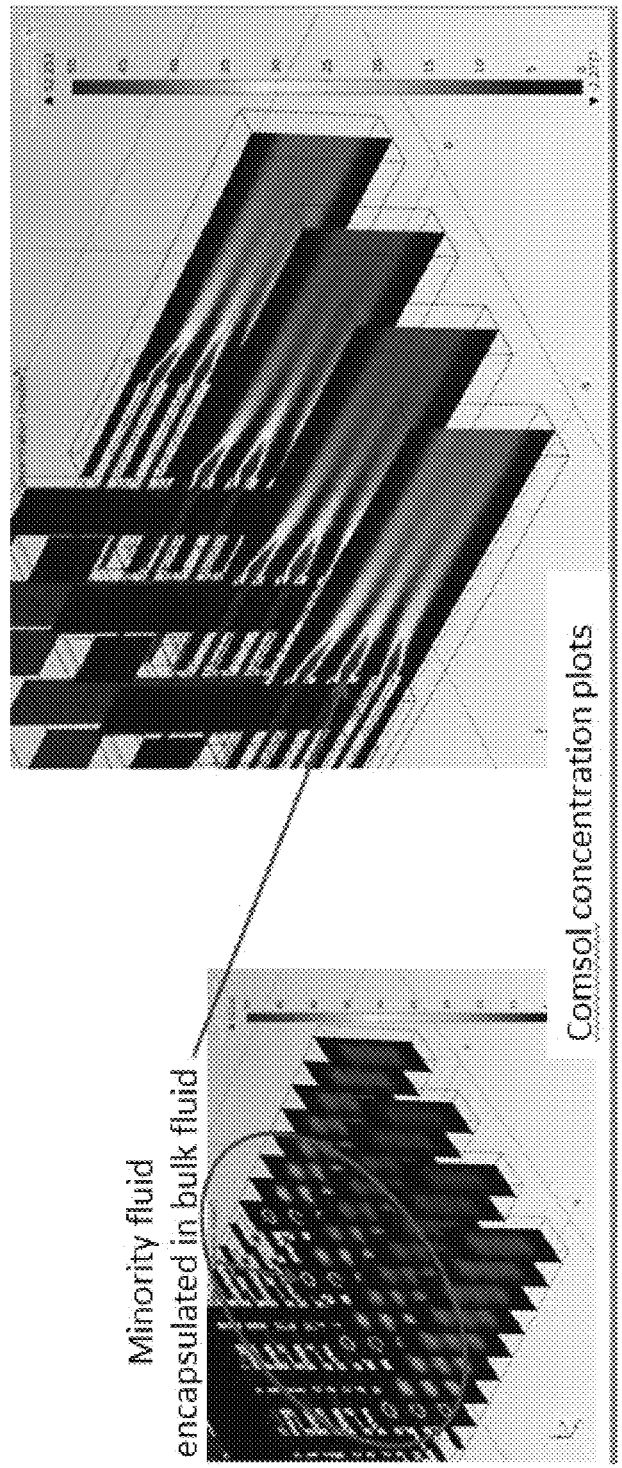
FIGS. 58A and 58B illustrate COMSOL plots of the device of FIG. 57.

FIG. 57 illustrates an alternative embodiment in which multiple flows can be combined within a flow path to achieve sheath flow. Again, as shown in the COMSOL plots of FIGS. 58A and 58B (a close-up view of FIG. 58A), the minority fluid can be encapsulated in the bulk fluid.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A fluid micro-mixer apparatus comprising:
   a plurality of first microchannels comprising at least one input port and at least one output port, the first microchannels being configured to receive a first fluid;
   a plurality of second microchannels comprising at least one input port and at least one output port, the second microchannels being configured to receive a second fluid;
   and a first mixing chamber disposed to receive the first and second fluids after the first and second fluids exit their respective output ports, the first mixing chamber providing a flow path in a first direction, and
   at least two passages that extend from the first mixing chamber to separate a flow of the first and second fluids from the first mixing chamber into at least two different flow paths, the at least two passages extending from the first mixing chamber such that respective flows in the at least two passages are in a direction opposite that of the first direction.

2. The apparatus of claim 1, further comprising a plurality of patterned laminae stacked so that adjacent patterned laminae define the first or second microchannels therebetween, the first and second microchannels having a width in a direction that is generally parallel to a plane of an adjacent lamina and a height in a direction that is generally perpendicular to the plane of the adjacent lamina, and
   wherein the width of the first microchannels is greater than the height of the first microchannels and the width of the second microchannels is greater than the height of the second microchannels.

3. The apparatus of claim 2, where the mixing chamber flow paths are defined by at least some of the plurality of the patterned laminae.

4. The apparatus of claim 1, further comprising a second mixing chamber, wherein the at least two different flow paths recombine further downstream from the first mixing chamber in the second mixing chamber.

5. The apparatus of claim 4, wherein the at least two passages are configured so that that respective fluid streams from the at least two different flow paths are recombined in the second mixing chamber with respective outer wall boundary layers being introduced into a middle portion of the second mixing chamber.

6. The apparatus of claim 4, wherein the second mixing chamber separates into at least two additional passages downstream from the second mixing chamber, and wherein the at least two additional passages define respective flow paths that recombine further downstream in a third mixing chamber.

7. The apparatus of claim 1, wherein the plurality of first and second microchannels are interdigitated.

8. The apparatus of claim 1, further comprising a plurality of dividers within one or more of the first and second microchannels that mechanically separate dispersed phase components from a continuous phase of the first or second fluids.

9. The apparatus of claim 1, further comprising a binding material disposed between adjacent patterned laminae.

10. The apparatus of claim 1, further comprising a fluid delivery device configured to deliver the first and second fluids at unequal flow rates.

11. The apparatus of claim 1, further comprising one or more additional microchannels configured to receive an additional one or more fluids, the additional one or more fluids being different from the first and second fluids.

12. The apparatus of claim 1, comprising a plurality of mixing chamber flow paths arranged in parallel in a dense array.

13. The apparatus of claim 1, wherein the outlet ports of the second microchannels have a smaller exit area than the outlet ports of the first microchannels.

14. The apparatus of claim 1, further comprising one or more drivers configured to provide pulsed flow to the second fluid.

15. The apparatus of claim 14, wherein the one or more drivers comprise piezo micropumps.

16. The apparatus of claim 1, further comprising a plurality of orifices between at least some adjacent microchannels.

17. The apparatus of claim 16, wherein the plurality of orifices are spaced to provide controlled introduction of a second fluid to a first fluid.

18. The apparatus of claim 1, further comprising a plurality of third microchannels comprising at least one input port and at least one output port, the third microchannels being configured to receive a third fluid, wherein the mixing chamber flow path is disposed to receive the third fluid after the third fluid exit its respective output ports.

19. An apparatus comprising:
a plurality of patterned laminae that are stacked so that adjacent patterned laminae define microchannels therebetween, wherein at least some of the microchannels comprise first outlet ports, the first outlet ports having a width in a direction that is generally parallel to a plane of an adjacent lamina and a height in a direction that is generally perpendicular to the plane of the adjacent lamina, and the width of the plurality of first outlet ports is greater than the height of the outlet ports; and
a mixing flow path downstream of the first outlet ports, the mixing flow path having a first mixing section in which a fluid stream can flow in a first direction, a split section and one recombination section, wherein the split section is a section where the mixing section splits into at least two channels that define separate flow paths and the recombination section is a section where the at least two separate flow paths recombine into a single flow path, wherein the at least two channels extend from the mixing section in a second direction that is opposite that of the first direction to reverse a portion of the fluid stream passing through respective channels.

20. The apparatus of claim 19, wherein adjacent ones of the microchannels formed by the patterned laminae and comprising first outlet ports do not intersect with one another, such that delivery of a first fluid and a second fluid through the adjacent microchannels does not result in mixing of the first and second fluids until exiting the adjacent microchannels.

21. The apparatus of claim 19, wherein at least some of the microchannels comprise second outlet ports, the second outlet ports comprising nozzles that have a smaller area than the first outlet ports.

22. The apparatus of claim 21, further comprising one or more drivers configured to provide pulsed flow of fluid out of the nozzles.

23. The apparatus of claim 22, wherein the one or more drivers comprise piezo micropumps.

24. The apparatus of claim 19, wherein the mixing flow path comprises a plurality of split sections and a plurality of recombination sections.

* * * * *